(12) United States Patent
Chou et al.

(10) Patent No.: US 10,099,326 B2
(45) Date of Patent: Oct. 16, 2018

(54) PLANT GROWTH SUPPORT AUTOMATIC MOLDING MACHINE

(71) Applicant: Yi Chou, Beijing (CN)

(72) Inventors: Yi Chou, Beijing (CN); Haiyan Wang, Beijing (CN)

(73) Assignee: Yi Chou, Beijing (CN)

( * ) Notice: Subject to any disclaimer, the term of this patent is extended or adjusted under 35 U.S.C. 154(b) by 47 days.

(21) Appl. No.: 15/186,943

(22) Filed: Jun. 20, 2016

(65) Prior Publication Data

US 2017/0087674 A1   Mar. 30, 2017

(30) Foreign Application Priority Data

Jun. 19, 2015  (CN) .......................... 2015 1 0345385

(51) Int. Cl.
  *B21F 15/08*  (2006.01)
  *B23P 19/04*  (2006.01)
  (Continued)

(52) U.S. Cl.
  CPC ................ *B23P 19/04* (2013.01); *A01G 9/12* (2013.01); *B21D 47/00* (2013.01); *B21F 27/12* (2013.01); *B21J 9/02* (2013.01); *B23K 11/002* (2013.01); *B23K 11/02* (2013.01); *B23K 11/115* (2013.01); *B21F 1/006* (2013.01); *B21F 1/008* (2013.01); *B21F 1/023* (2013.01); *B21F 1/026* (2013.01); *B21F 3/00* (2013.01); *B21F 15/08* (2013.01); *B21F 27/00* (2013.01); *B21F 27/10* (2013.01);
  (Continued)

(58) Field of Classification Search
  CPC ........ B23Q 39/00; B23Q 39/02; B23Q 41/00; B23Q 41/04; B23Q 41/06; B21F 15/00; B21F 15/02; B21F 15/06; B21F 15/08; B21F 1/006; B21F 1/008; B21F 1/02; B21F 1/023; B21F 1/026; B21F 27/00–27/22; B21F 45/00–45/28; B21F 3/00; B21F 37/00; B21F 27/005; B21F 27/08; B21F 27/10; B21F 27/121; B21F 27/125; B21F 27/20; Y10T 29/49968; Y10T 29/5187; Y10T 29/5198
  USPC ...... 29/34 D, 564, 564.1, 566, 33 F; 140/88, 140/112
  See application file for complete search history.

(56) References Cited

U.S. PATENT DOCUMENTS 2,439,548 A * 4/1948 Planeta ................... B21F 27/12
                                                140/71 R
4,372,351 A * 2/1983 Myers ..................... B21F 27/12
                                                140/112

(Continued)

*Primary Examiner* — Daniel Howell
*Assistant Examiner* — Yasir Diab
(74) *Attorney, Agent, or Firm* — Brinks Gilson & Lione

(57) ABSTRACT

The present disclosure relates to an automatic forming machine for plant growth supports, comprising a ring rolling system with a ring rolling unit, a mold system with a mold unit, and a welding system, which are all disposed on a machine frame, wherein the ring rolling unit can roll a metal wire and make the metal wire be formed into a ring with an opening in the mold unit; the mold system is for carrying the ring and making two free ends of the ring with an opening aligned or alternately overlap with each other; the welding system welds can weld the opening of the ring carried by the mold unit, causing the ring to become a closed ring. The present disclosure has a high automatic degree and can reduce the production time and labor cost.

29 Claims, 12 Drawing Sheets

(51) Int. Cl.
  *A01G 9/12* (2006.01)
  *B21D 47/00* (2006.01)
  *B21J 9/02* (2006.01)
  *B23K 11/00* (2006.01)
  *B23K 11/02* (2006.01)
  *B21F 27/12* (2006.01)
  *B23K 11/11* (2006.01)
  *B21F 3/00* (2006.01)
  *B21F 37/00* (2006.01)
  *B21F 1/00* (2006.01)
  *B21F 27/10* (2006.01)
  *B23Q 39/02* (2006.01)
  *B21F 1/02* (2006.01)
  *B21F 45/00* (2006.01)
  *B21F 27/00* (2006.01)
  *B23P 23/04* (2006.01)
  *B23K 101/32* (2006.01)

(52) U.S. Cl.
  CPC ............ *B21F 37/00* (2013.01); *B21F 45/00* (2013.01); *B23K 2201/32* (2013.01); *B23P 23/04* (2013.01); *B23Q 39/02* (2013.01); *Y10T 29/49968* (2015.01); *Y10T 29/5187* (2015.01)

(56) References Cited

U.S. PATENT DOCUMENTS

| | | | |
|---|---|---|---|
| 4,478,260 A * | 10/1984 | Eichler | A01G 23/04 140/112 |
| 5,114,086 A * | 5/1992 | Ho | H01F 41/09 242/445.1 |
| 6,484,392 B1 * | 11/2002 | Okada | H01B 13/228 174/102 R |
| 2015/0375291 A1 * | 12/2015 | Brottlund | B21F 5/005 29/33 F |

* cited by examiner

PLANT GROWTH SUPPORT AUTOMATIC MOLDING MACHINE

CROSS-REFERENCE TO RELATED APPLICATION

The present disclosure claims priority to the Chinese National Application No. 201510345385.X, filed on Jun. 19, 2015, the entire disclosure of which application is expressly incorporated herein by reference.

FIELD OF THE DISCLOSURE

The present disclosure relates to the field of agricultural machinery, and more specifically relates to an automatic forming machine for plant growth supports.

BACKGROUND OF THE DISCLOSURE

A plant growth support is a framework for supporting plants during their growth. For example, tomato frames are a kind of crop assistive products commonly used in European countries and America, which are mainly formed by assembly welding a plurality of iron rings with different diameters and a plurality of straight wires.

At present, manufacturing such a product involves multiple steps: first, rolling a straightened metal wire into rings of different diameters and then cutting them off to form open rings, and then welding open parts into metal circles for standby use; also straightening another metal wire and cutting it into straight wires with desired length for standby use; then, three or more rings of different diameters are equidistantly welded together with three straight wires on a dedicated welding machine. Among the above steps, ring rolling is performed by a ring rolling machine, which needs no manual operation in normal production; ring welding is performed by a butt welder (electric resistance welding), normal operation of which needs an operator to place an open ring onto a weld bond of the butt welder for welding. Wire straightening is directly implemented by a straightening machine, then, the welded rings and straight wires are placed on a dedicated welding machine for assembly welding. In other words, the above steps are respectively performed by four different facilities, moreover, the welding must need manual operation, and the linkage between adjacent steps can only be performed manually. Therefore, the economic costs and labor costs are relatively high.

SUMMARY OF THE DISCLOSURE

An objective of the present disclosure is to provide an automatic forming machine for plant growth supports that can save time and labor costs while enhancing productivity.

In order to achieve the above objective, the present disclosure provides an automatic forming machine for plant growth supports, comprising a wire rolling system, a mold system, and a welding system, which are all disposed on a machine frame, wherein the wire rolling system is for rolling a plurality of metal wires into rings concurrently; the mold system is for carrying the respective rings and driving the respective rings to synchronously rotate by a set angle; for each rotation, the welding system welds one straight wire to the respective rings, till rotating to complete all welding procedures, thereby the plant growth support being molded.

In one preferred or optional embodiment, the wire rolling system comprises a ring rolling support frame on which a plurality of ring rolling units are provided; each of the ring rolling units comprises a ring rolling apparatus and a cutoff apparatus; when the ring rolling apparatus rolls the metal wires into rings, the rings are cut off by the cutoff apparatus.

In one preferred or optional embodiment, the cutoff apparatus comprises a stationary cutter, a moving cutter, a cutoff transmission means, and a cutoff driving means, wherein the stationary cutter is fixedly provided on the ring rolling support frame, the moving cutter is provided with a through-hole for a metal wire to pass through, the moving cutter is connected to the cutoff transmission means, the cutoff transmission means is connected to the cutoff driving means, thus power provided by the cutoff driving means can be transmitted to the moving cutter through the cutoff transmission means to drive the moving cutter to move relative to the stationary cutter; in a state that the moving cutter approaches the stationary cutter, the metal wires can be cut off by cooperation between the stationary cutter and the moving cutter.

In a preferred or optional embodiment, the wire rolling system further comprises a rotation power apparatus, the rotation power apparatus is drivingly connected to the ring rolling support frame, and the ring rolling support frame is supported by a support base assembly that is fixedly provided on the machine frame; driven by the rotation power apparatus, the ring rolling support frame can rotate relative to the machine frame, thereby reaching a wire rolling work position or exiting from the wire rolling work position.

In one preferred or optional embodiment, the rotation power apparatus comprises a first air cylinder, a cylinder barrel of the first air cylinder is fixedly provided on the ring rolling support frame, a piston rod of the first air cylinder is hinged with a first connecting rod, and the first connecting rod is fixedly connected to a fixed shaft on the support base assembly.

In one preferred or optional embodiment, the ring rolling unit further comprises guide wheel means, straightening apparatus, and traction and length measuring apparatus, wherein a metal wire is guided by the guide wheel means into the straightening apparatus; after being straightened by the straightening apparatus, the traction and length measuring apparatus measures its length and pulls it into the ring rolling apparatus.

In one preferred or optional embodiment, the mold system comprises a mold support frame on which a mold power apparatus and a plurality of mold units are provided, and the mold units are for carrying the rolled rings, while the mold power apparatus is drivingly connected to all the mold units so as to drive all the mold units to rotate.

In one preferred or optional embodiment, the mold unit comprises a baseplate on which a turntable is provided; the baseplate is provided with a lap of first groove for holding rings, and a plurality of second grooves for holding straight wires are evenly and intermittently disposed on both of the baseplate and the turntable; the mold power apparatus is drivingly connected to the baseplate, so as to drive the baseplate and the turntable to rotate synchronously.

In one preferred or optional embodiment, the baseplate comprises a first baseplate element and a second baseplate element that are engaged with each other; the turntable comprises a first turntable element and a second turntable element that are engaged with each other; the first baseplate element is connected to the first turntable element, the second baseplate element is connected to the second turntable element, and the first baseplate element is slidably connected to the second baseplate element through the first engaging part between them, thus the second engaging part between the first baseplate element and the second baseplate element can be opened to form a wire rolling work position for the wire rolling system to roll rings.

In one preferred or optional embodiment, the mold unit further comprises a pushout assembly, and the pushout assembly is drivingly connected to the second baseplate element, causing the first baseplate and the second baseplate element to slide relative to each other at the first engaging part, further causing the second engaging part between the first baseplate element and the second baseplate element to be opened.

In one preferred or optional embodiment, the mold power apparatus comprises an electric motor, a coupling, a third transmission shaft and gears, and further comprises gear rings fixedly provided on the mold units, wherein the electric motor is drivingly connected to the gears via the coupling and the third transmission shaft, and the gear is engaged with the gear ring to drive the mold units to rotate.

In one preferred or optional embodiment, magnetic steel assemblies for attracting straight wires are provided on the turntable at positions corresponding to the respective second grooves.

In one preferred or optional embodiment, the welding system comprises a welding power apparatus, a welding connection apparatus and a plurality of welding units; the respective welding units are provided on the welding connection apparatus; the welding power apparatus is drivingly connected to the welding connection apparatus, so the welding connection apparatus can drive the respective welding units to reach a welding work position for welding the straight wire and the respective rings, and exit from the welding work position after the welding is completed.

In one preferred or optional embodiment, the welding unit comprises an upper welding electrode, an upper welding electrode base, a lower welding electrode and a lower welding electrode base; the lower welding electrode is fixedly provided on the lower welding electrode base; the upper welding electrode is slidably disposed on a guide rail that is disposed in a guide rail groove on the upper welding electrode base, thus the upper welding electrode can move up and down along the guide rail so as to cooperate, when approaching the lower welding electrode, with the lower welding electrode for welding.

In one preferred or optional embodiment, the automatic forming machine for plant growth supports further comprises a wire straightening system disposed on the machine frame, the wire straightening system being for providing straight wires to be welded with the rings.

In one preferable or alternative embodiment, the wire straightening system comprises a straightening apparatus, a traction and length measuring apparatus, a cutoff apparatus and a blanking structure, which are sequentially disposed; the metal wire enters into the traction and length measuring apparatus after being straightened by the straightening apparatus, and moves towards the cutoff apparatus under a traction action of the traction and length measuring apparatus; when reaching a preset length, the cutoff apparatus cuts off the straight wire; and the straight wire falls into the mold system through the blanking structure.

In one preferred or optional embodiment, the automatic forming machine for plant growth supports further comprises a mechanical arm system disposed on the machine frame, and the mechanical arm system is for taking down the plant growth support after it is formed.

In one preferred or optional embodiment, the mechanical arm system comprises a first power apparatus, a fixed arm assembly, a movable arm assembly, and a second power apparatus; the first power apparatus is drivingly connected to the fixed arm assembly so as to drive the fixed arm assembly to self-rotate; the movable arm assembly is provided within the fixed arm assembly; the second power apparatus is drivingly connected to the movable arm assembly so as to drive the movable arm assembly to move back and forth along the fixed arm assembly; the movable arm assembly is provided with a wire grabbing apparatus for grabbing the plant growth support.

In one preferred or optional embodiment, the first power apparatus comprises a fourth air cylinder that is drivingly connected to a movable bevel gear disposed on the fixed arm assembly through a connecting rod transmission structure; the movable bevel gear is engaged with a fixed bevel gear fixedly provided on the machine frame so as to cause the fixed arm assembly to self-rotate.

In one preferred or optional embodiment, the second power apparatus comprises a drive motor, a driving wheel, a driven wheel, and a synchronous belt; the drive motor is drivingly connected to the driving wheel; the driving wheel drives the driven wheel to rotate through the synchronous belt; the movable arm assembly is disposed on the synchronous belt and driven by the synchronous belt to move back and forth along the fixed arm assembly.

In one preferred or optional embodiment, the wire grabbing apparatus comprises a fixed hood; a wire grabbing drive motor is provided on the fixed hood; the wire grabbing drive motor is drivingly connected to a guide shaft in the fixed hood; a guide nut is threadedly connected to the guide shaft; the guide nut is fixedly connected to a pressure plate; the pressure plate is connected to a plurality of pressure blocks; thus the wire grabbing drive motor drives the guide shaft to rotate, then the guide nut moves along the guide shaft to drive the pressure plate and pressure blocks to move, which can change an gap between the pressure blocks and the fixed hood; when the gap between the pressure block and the fixed hood is narrowed, the straight wires of the plant growth support can be tightly pressed to achieve wire grabbing; when the gap between the pressure blocks and the fixed hood is broadened, the straight wires of the plant growth support can be released to achieve wire releasing.

Based on the technical solutions above, the present disclosure at least has the following advantageous effects:

The automatic forming machine for plant growth supports according to the present disclosure at least comprises a wire rolling system, a mold system, and a welding system; the wire rolling system is for rolling a plurality of metal wires into rings simultaneously; the mold system is for carrying the respective rings and driving the respective rings to synchronously rotate by a set angle; for each rotation, the welding system will weld one straight wire to respective rings, and till all welding procedures in which the straight wires are welded with the respective rings are completed, the plant growth support is formed. The present disclosure solves the issue that the existing production process of the plant growth support, including the rolling step, the wire straightening step and the welding step, must be implemented by a plurality of facilities, which results in a higher time and labor cost; the present disclosure has a high automatic degree and can reduce the production time and labor cost.

BRIEF DESCRIPTION OF THE ACCOMPANYING DRAWINGS

The drawings illustrated here provide further understanding of the present disclosure and constitute a part of the present application. The exemplary embodiments of the present disclosure, as well as their explanations, are used for interpreting the present disclosure and thus do not constitute unduly limitation to the present disclosure. In the accompanying drawings.

REFERENCE NUMERALS IN THE DRAWINGS

Figure 1:
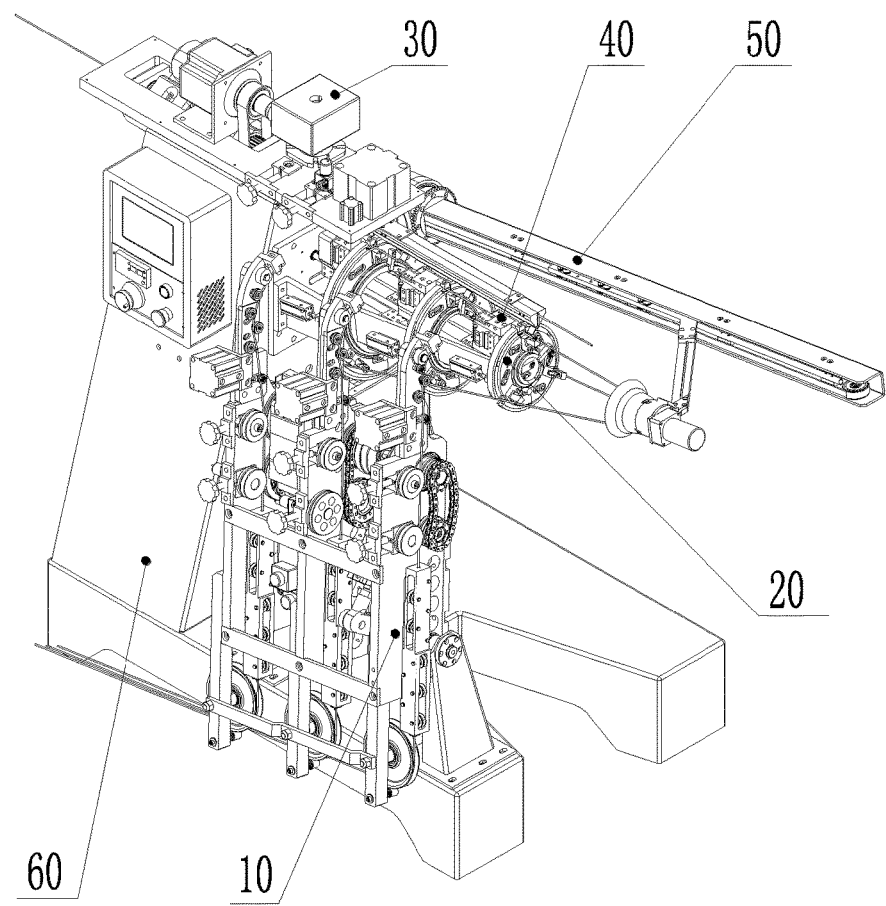
FIG. 1 illustrates an overall perspective view of an exemplary embodiment of automatic forming machine for plant growth supports according to the present disclosure.

10—ring rolling system; 11—ring rolling support frame; 111—connecting plate; 12—rotation power apparatus; 121—first air cylinder; 122—first connecting rod; 123—first stationary shaft; 124—second stationary shaft; 13—ring rolling unit; 131—guide wheel means; 132—straightening apparatus; 133—traction and length measuring apparatus; 134—ring rolling apparatus; 135—cutoff apparatus; 1351—stationary cutter; 1352—moving cutter; 1353—through-hole; 1354—stationary cutter base; 1355—rectangular groove; 1356—square hole; 136—cutoff transmission means; 1361—first transmission shaft; 1362—second connecting rod; 1363—second transmission shaft; 1364—poking head; 137—cutoff driving means; 1371—second air cylinder; 1372—piston rod guiding seat; 14—first support base assembly; 15—second support base assembly;

20—mold system; 21—mold support frame; 211—mount plate; 212—connecting plate; 22—mold power apparatus; 221—electric motor; 222—coupling; 223—third transmission shaft; 224—gear; 23—mold unit; 231—baseplate; 2311—first baseplate element; 2312—second baseplate element; 232—turntable; 2321—first turntable element; 2322—second turntable element; 233—pushout assembly; 234—return assembly; 235—gear ring; 236—fixed barrel; 237—magnetic assembly; 238—tablet assembly; 239—installation slot;

30—straight wire supplying system; 31—straightening apparatus; 32—traction and length measuring apparatus; 33—cutoff apparatus; 34—blanking structure;

40—welding system; 41—welding power apparatus; 42—welding connection apparatus; 421—rear sliding rod; 422—left welding electrode; 423—right welding electrode; 424—welding electrode connecting plate; 425—front sliding rod; 426—supporting base; 43—transformer apparatus; 44—welding unit; 441—upper welding electrode; 442—upper welding electrode base; 443—lower welding electrode; 444—lower welding electrode base; 445—third air cylinder; 446—guide rail; 447—guide rail groove; 448—circular welding electrode;

50—removing system; 51—first power apparatus; 511—fourth air cylinder; 512—third connecting rod; 513—fourth transmission shaft; 514—movable bevel gear; 515—fixed bevel gear; 516—rotary shaft base; 517—stationary sleeve; 52—fixed arm assembly; 521—fixed arm; 522—guide rod; 53—movable arm assembly; 531—movable arm; 532—movable roller; 54—second power apparatus; 541—drive motor; 542—driving wheel; 543—driven wheel; 544—synchronous belt; 55—wire grabbing apparatus; 551—fixed hood; 552—wire grabbing drive motor; 553—guide shaft; 554—guide nut; 555—pressure plate; 556—pressure block; 557—fourth connecting rod; 558—fixed barrel; 559—protective shield;

60—machine frame; 70—plant growth support;

1a, 1b, 1c—metal wire; 2a—ring; 3a—straight wire.

DETAILED DESCRIPTION OF THE DISCLOSURE

Here in after, technical solutions in the embodiments will be described clearly and completely in conjunction with the drawings in the embodiments of the present disclosure. Apparently, the embodiments described here are only part of embodiments of the present disclosure, not all of them. Based on the embodiments of the present disclosure, all other embodiments obtained by a person of normal skill in the art without exercise of inventive work fall within the protection scope of the present disclosure.

In depiction of the present disclosure, it should be understood that orientations or positional relationships indicated by terms like "center," "longitudinal," "transversal," "front," "rear," "left," "right," "vertical," "top," "bottom," "inner," "outer" and others are based on the orientations or positional relationships illustrated in the accompanying drawings, which are only for facilitating depiction of the present disclosure and simplifying the depiction, rather than indicating or suggesting that the specified means or elements must have specific orientations or have to be constructed and operated with the specific orientations; therefore, they should not be understood as limitation to the protection scope of the present disclosure.

With reference to FIG. 1-FIG. 16, the automatic forming machine for plant growth supports according to the present disclosure, comprises a ring rolling system 10, a mold system 20, and a welding system 40, which are all disposed on a machine frame 60 of the automatic forming machine for plant growth supports, the ring rolling system 10 comprises a ring rolling unit 13, and the mold means 20 comprises a mold unit 23, wherein the ring rolling unit 13 can roll a metal wire and make the metal wire be formed into a ring 2a with an opening in the mold unit 23 ring rolling system; the mold system 20 is for carrying the ring 2a and making two free ends of the ring 2a with an opening aligned or overlap with each other; the welding system 40 can weld the opening of the ring 2a carried by the mold unit 23, causing the ring 2a to become a closed ring. The rings 2a is used as the bearing rings of the plant growth support 70, and are to be welded with straight wires to form the plant growth support 70.

Because the mold apparatus 20 is capable of making the two free ends of the ring 2a maintain mutually aligned or alternatively overlapped by holding the free ends of the ring 2a, there is no need for the operators to hold manually the opening of the ring 2a during the welding the opening of the ring 2a, thus the present disclosure, compared with the prior art, can effectively reduce manual participation during the forming procedure of the plant growth support, which saves time and labor cost and enhances the productivity.

As illustrated in FIG. 1, an exemplary embodiment of a automatic forming machine for plant growth supports according to the present disclosure is provided. In the exemplary embodiment, the automatic forming machine for plant growth supports mainly comprises: a ring rolling system 10, a mold system 20, a straight wire supplying system 30, a welding system 40, a removing system 50, a machine frame 60, and a control system, etc.

The machine frame 60 provides a mount body for respective parts. The ring rolling system 10, the mold system 20, the straight wire supplying system 30, the welding system 40, and the removing system 50 and others are all mounted on the machine frame 60.

The ring rolling system 10 is for rolling a plurality of metal wires and making the metal wires be formed into a plurality of rings 2a in the mold system 20; the mold system 20 is for carrying the respective rings 2a and making two free ends of each ring (2a) with an opening aligned or overlap with each other, moreover, the mold system 20 is capable of driving the respective rings 2a to synchronously rotate by a set angle, and for each rotation, a straight wire is provided by the straight wire supplying system 30; then the welding system 40 welds each straight wire provided by the straight wire providing system 30 onto the respective rings 2a, and during this process the opening of each ring 2a is also welded; till rotating to finish welding all straight wires with the respective rings, the plant growth support is formed; and the removing system 50 is for taking down and stacking the formed plant growth support.

Here in after, specific structures of respective systems will be described in detail with reference to the accompanying drawings.

Figure 2:
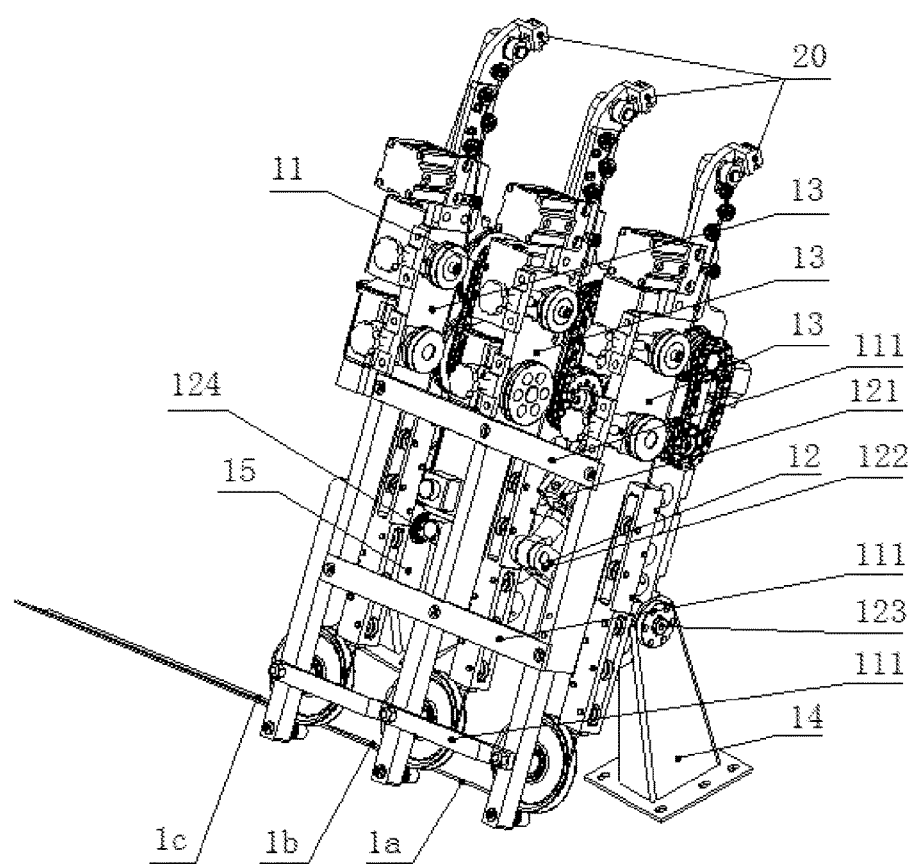
FIG. 2 illustrates a perspective view of a ring rolling system according to the present disclosure.

As illustrated in FIG. 2, the ring rolling system comprises a ring rolling support frame 11 on which a rotation power apparatus 12 and a plurality of ring rolling units 13 are provided.

The rotation power apparatus 12 is drivingly connected to the ring rolling support frame 11 to drive the ring rolling support frame 11 to rotate relative to the machine frame 60, so that the ring rolling system 10 can move towards to the mold system 20 and arrive at a rolling position to perform ring rolling, and then after the ring rolling is completed, the ring rolling system 10 can exit from the rolling position, and move away from the mold system 20.

Further, the ring rolling support frame 11 comprises a plurality of interconnected connecting plates 111; the ring rolling support frame 11 as a whole is supported by a support base assembly, which is fixedly provided on the machine frame 60. Driven by the rotation power apparatus 12, the ring rolling support frame 11 can rotate relative to the machine frame 60, causing the ring rolling unit 13 able to move between the rolling position and the non rolling position, thereby arriving at or exiting from the rolling position, where the ring rolling unit 13 starts to roll the metal wire and make, in the mold unit 23, the metal wire be formed into the ring 2a with an opening, namely the ring rolling unit 13 implementing the ring rolling action.

In one preferred or optional embodiment, the support base assembly may comprise a first support base assembly 14 and a second support base assembly 15, which are both fixedly provided on the machine frame 60.

The rotation power apparatus 12 comprises a first air cylinder 121, a first connecting rod 122, a first stationary shaft 123, and a second stationary shaft 124. The first stationary shaft 123 is fixedly provided on the first support base assembly 14; the second stationary shaft 124 is fixedly provided on the second support base assembly 15; one side of the ring rolling support frame 11 is rotatably connected to the second stationary shaft 124, so that the ring rolling support frame 11 can rotate relative to the second stationary shaft 124. The other side of the ring rolling support frame 11 is provided with the first air cylinder 121, whose piston rod is hinged with one end of the first connecting rod 122, while the other end of the first connecting rod 122 is fixedly connected to the first stationary shaft 123. When the piston rod of the first air cylinder 121 drives the first connecting rod 122, because of the fixed connection between the first connecting rod 122 and the first stationary shaft 123, a reaction force will be generated, which will drive the ring rolling support frame 11 to rotate relative to the machine frame 60, thereby realizing the entry and the exit of the whole ring rolling system 10. When the ring rolling system 10 moves into the rolling position, it cooperates with the mold system 20 to make the rolled-out rings enter into the mold system 20. And when the ring rolling system 10 completes the rolling action, it moves out of the rolling position, and moves away from the mold system 20. For the reason that the ring rolling system 10 can move away from the rolling position, there is less possibility that the mold apparatus 20, the straight wire supplying systems 30, and the welding means 40 are being interfered by the ring rolling system 10 after the ring rolling being finished, which makes the whole automatic forming machine for plant growth supports work more continuously and smoothly.

Figure 3:
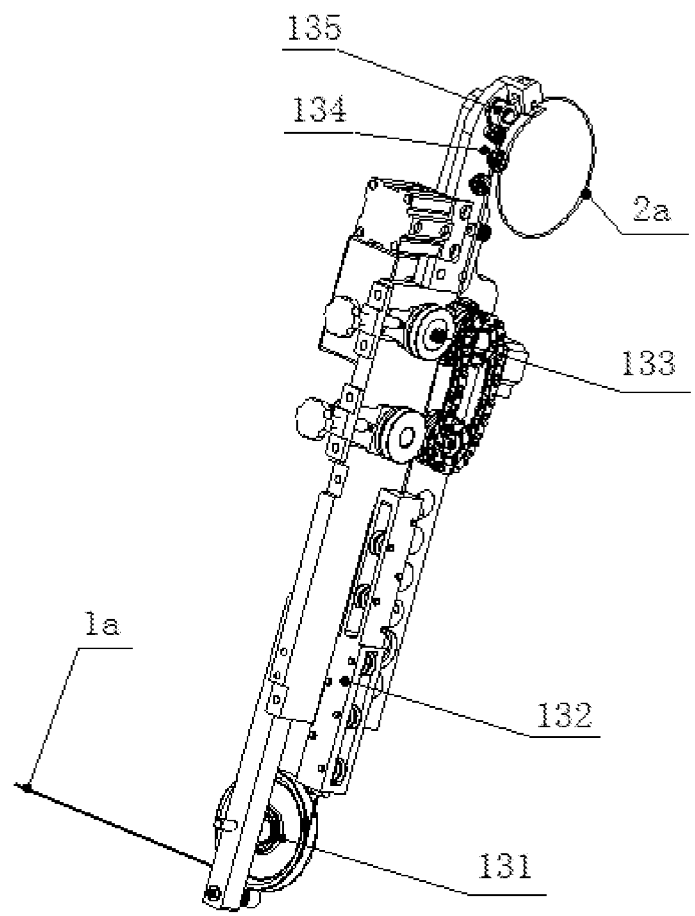
FIG. 3 illustrates a perspective view of a ring rolling unit according to the present disclosure.

As illustrated in FIG. 3, each rolling unit 13 comprises guide wheel means 131, straightening apparatus 132, traction and length measuring apparatus 133, ring rolling apparatus 134, and cutoff apparatus 135, which are sequentially disposed on the ring rolling support frame 11. The guide wheel means 131 comprises a guide wheel. A metal wire is guided by the guide wheel means 131 and then straightened by the straightening apparatus 132; the traction and length measuring apparatus 133 measures the length of the straightened metal wire and drags it into the ring rolling apparatus 134. In the ring rolling apparatus 134, the metal wire is rolled into a ring, and once the length of the straightened metal wire reaches the preset length inside the traction and length measuring apparatus 133, the straightened metal wire is cut off by the cutoff apparatus 135.

As illustrated in FIG. 3, the straightening apparatus 132 comprises a plurality of groups of rollers staggerly arranged in two rows. The metal wire becomes relatively straightened after passing through the two rows of rollers, providing a raw material with a relatively steady physical properties for subsequent rolling. The straightening apparatus 132 may be implemented by the prior art, which will not be detailed here. The mounting direction of the straightening apparatus 132 needs to guarantee that the metal wire passes through the respective groups of rollers and is parallel to the mount plane on the ring rolling support frame 11 where the rollers are mounted. The straightened metal wire enters into the ring rolling apparatus 134 through the traction and length measuring apparatus 133.

The traction and length measuring apparatus 133 comprises two pairs of rollers whose axes are parallel. In the first pair of rollers, one roller is driven to rotate by an electric motor or other driving means so as to act as a drive roller, while the other roller acts as an auxiliary pressure roller. In the second pair of rollers, one roller is driven to rotate by the drive roller in the first pair of rollers through a chain (or other transmission means), while the other roller acts as an auxiliary pressure roller. The metal wire passes between the two pairs of rollers, and the auxiliary pressure roller axially presses the metal wire tightly on the drive roller. The traction and length measuring apparatus 133 pulls the metal wire to pass through the straightening apparatus 132 and provides power to the next step of rolling the metal wire.

A length counter in the traction and length measuring apparatus 133 is disposed on one roller of a pair of rollers whose outer ring surfaces are tangent. The roller with the length counter acts as a length counting roller, while the other roller which is tangent to the length counting roller acts as an auxiliary pressure roller. The length counting roller and the length counter (e.g., a rotary encoder) rotate co-axially. The metal wire passes between the two rollers, and the auxiliary pressure roller axially presses the metal wire tightly on the length counting roller. The metal wire drives the length counter to rotate to obtain an outreaching size. In the state of reaching the preset length within the traction and length measuring apparatus 133, the metal wire is cut off by the cutoff apparatus 135. The traction and length measuring apparatus 133 may be implemented by the prior art, which will not be detailed here.

The ring rolling apparatus 134 may be implemented by a three-roller ring rolling apparatus. The three-roller ring rolling apparatus comprises three rollers that are disposed sequentially on a mount board of the ring rolling support frame 11, wherein one roller is disposed at one side of the metal wire, i.e., the inner tangent plane of the rolled ring, while the other two rollers are disposed at the other side of the metal wire, i.e., the external tangent plane of the rolled ring. By adjusting the positions of the three rollers, a geometric outer diameter of the rolled ring can be changed. The metal wire is physically yielded into a ring by the three rollers. During work, each time a ring is shaped, the length counter emits a signal to stop the three rollers from rotating, and the cutoff apparatus 135 cuts off the metal wire, and then the three rollers are driven to rotate again to start a next round of work. The input axis of the metal wire is co-axial with the output axis of the traction and length measuring apparatus 133.

Based on the three-roller ring rolling apparatus, the metal wire is rolled into a ring under the yielding force of the three rollers, and if it is not cut off, a group of spiral threads should be rolled out. In the prior art, after a group of ring is rolled out by the ring rolling machine, the metal wire will be cut off immediately. In the present disclosure, the metal wire rod can be rolled out just one lap, or one lap and a little more, i.e., the two free ends of the ring 2a with an opening may be aligned or overlapped with each other. For the automatic forming machine for plant growth supports provided in this embodiment, after the metal wire is rolled for one lap and a little more, i.e., overlapping about 10 mm, it is cut off by the cutoff apparatus 135, and the entire ring rolling system 10 exists from the rolling position, then the welding system 40 performs welding on the spot.

Figure 4:
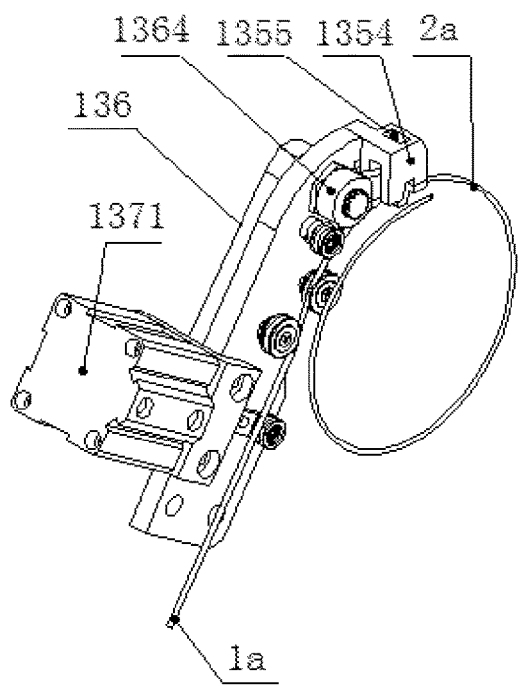
FIG. 4 illustrates a first perspective view of cutoff apparatus in a ring rolling unit according to the present disclosure.
Figure 5:
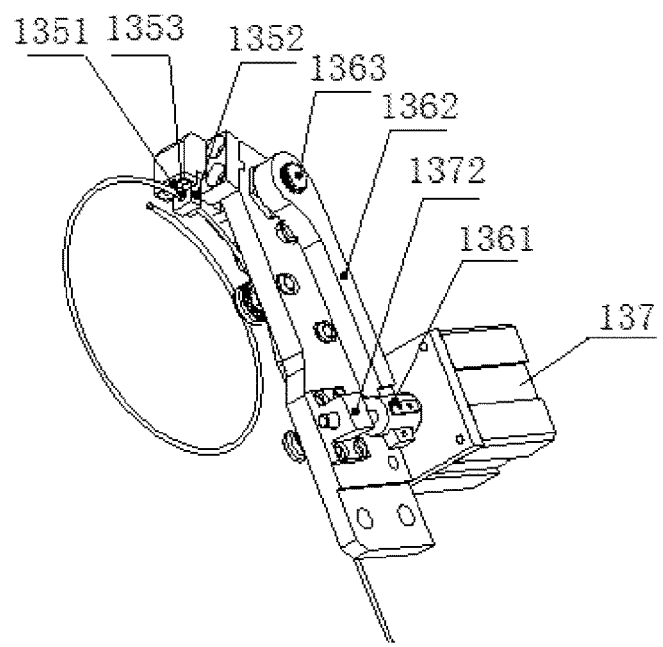
FIG. 5 illustrates a second perspective view of cutoff apparatus in a ring rolling unit according to the present disclosure.
Figure 6:
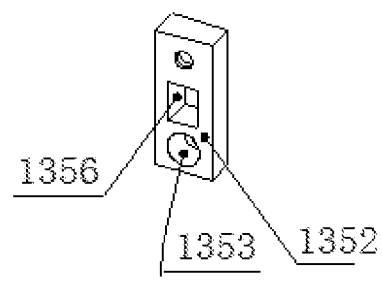
FIG. 6 illustrates a structural diagram of a moving cutter in a cutoff apparatus according to the present disclosure.

As illustrated in FIG. 4-FIG. 6, the cutoff apparatus 135 is mounted at the rear end of the ring rolling apparatus 134 which is mounted on the ring rolling support frame 1111. The cutoff apparatus 135 comprises a stationary cutter 1351, a moving cutter 1352, a cutoff transmission means 136, and a cutoff driving means 137. The stationary cutter 1351 is fixedly provided on the ring rolling support frame 11. A through-hole 1353 for a metal wire to pass through is provided on the moving cutter 1352. The moving cutter 1352 is connected to the cutoff transmission means 136. The cutoff transmission means 136 is connected to the cutoff driving means 137. Power provided by the cutoff driving means 137 is transmitted to the moving cutter 1352 through the cutoff transmission means 136 to drive the moving cutter 1352 to move relative to the stationary cutter 1351; in a state that the moving cutter 1352 approaches the stationary cutter 1351, the metal wire can be cut off through cooperation between the stationary cutter 1351 and the moving cutter 1352.

Further, the stationary cutter 1351 may be mounted at the bottom of the stationary cutter base 1354 that is mounted on the ring rolling support frame 11; and the moving cutter 1352 is disposed within a rectangular groove 1355 on the stationary cutter base 1354. A through-hole 1353 is provided on the cutter 1352. An initial position of the moving cutter 1352 is disposed where the metal wire starts to be rolled into a ring (i.e., the rolling position); the metal wire is formed into a ring by the ring rolling apparatus 134 while passing through the through-hole 1353 on the moving cutter 1352, so that normal ring rolling of the metal wire is not affected; and then the metal wire enters into the mold system 20. Power provided by the cutoff driving means 137 is transmitted to the moving cutter 1352 through the cutoff transmission means 136; the moving cutter 1352 is restricted within the rectangular groove 1355 of the stationary cutter base 1354 by the cutoff transmission means 136, but is movable up and down within the rectangular groove 1355. After one lap of the metal wire ring is completed with a set-length overlap, the moving cutter 1352 moves upward driven by the cutoff transmission means 136, and with the cooperation of the stationary cutter 1351, cuts off the metal wire ring from the overlap between the first lap and the second lap.

In one preferred or optional embodiment, the cutoff driving means 137 may be implemented by a second air cylinder 1371 that is fixed on the ring rolling support frame 11 at the rear part of the ring rolling apparatus 134 through a cylinder base and a piston rod guiding seat 1372. The cutoff transmission means 136 may comprise a first transmission shaft 1361, a second connecting rod 1362, a second transmission shaft 1363, and a poking head 1364. The first transmission shaft 1361 is fixedly connected to the piston rod of the second air cylinder 1371; one end of the second connecting rod 1362 is fixedly provided through the first transmission shaft 1361; the second transmission shaft 1363 is fixedly provided through the other end of the second connecting rod 1362; besides, the second transmission shaft 1363 is fixedly connected to one end of the poking head 1364, the other end of the poking head 1364 is inserted into a square hole 1356 disposed at a middle part of the moving cutter 1352; the moving cutter 1352 is disposed within the rectangular groove 1355 provided on the stationary cutter base 1354.

During the procedure in which the metal wire is rolled into a ring of a desired diameter by the ring rolling apparatus 134, the metal wire enters into the mold system 20 to form a ring through the through-hole 1353 disposed on the moving cutter 1352. Then the second air cylinder 1371 starts to drive the first transmission shaft 1361 to move reciprocally within the piston rod guiding seat 1372, so that drives the second connecting rod 1362 to cause the second transmission shaft 1363 to rotate; rotation of the second transmission shaft 1363 can drive the poking head 1364 to rotate, thereby causing the moving cutter 1352 to move up and down within the rectangular groove 1355 disposed on the stationary cutter base 1354; when the moving cutter 1352 moves upward, the ring can be cut off under the cooperation between the moving cutter 1352 and the stationary cutter 1351.

The ring rolling system 10 provided in the embodiment above comprises a plurality of ring rolling units 13. In the preferred embodiment illustrated in FIG. 3, the ring rolling system 10 comprises three groups of ring rolling units 13 with the same structure but of different dimensions, and correspondingly comprises three groups of ring rolling apparatus 134 and cutoff apparatus 135, which are assembled together with a certain spacing based on the product size. Three sets of electric motors respectively drive a metal wire to feed in each ring rolling unit 13. Thus three metal wires can be rolled into spiral metal rings of different diameters according to the needs, forming to-be-welded open metal rings and then being cut off by the cutoff apparatus 135.

Figure 10:
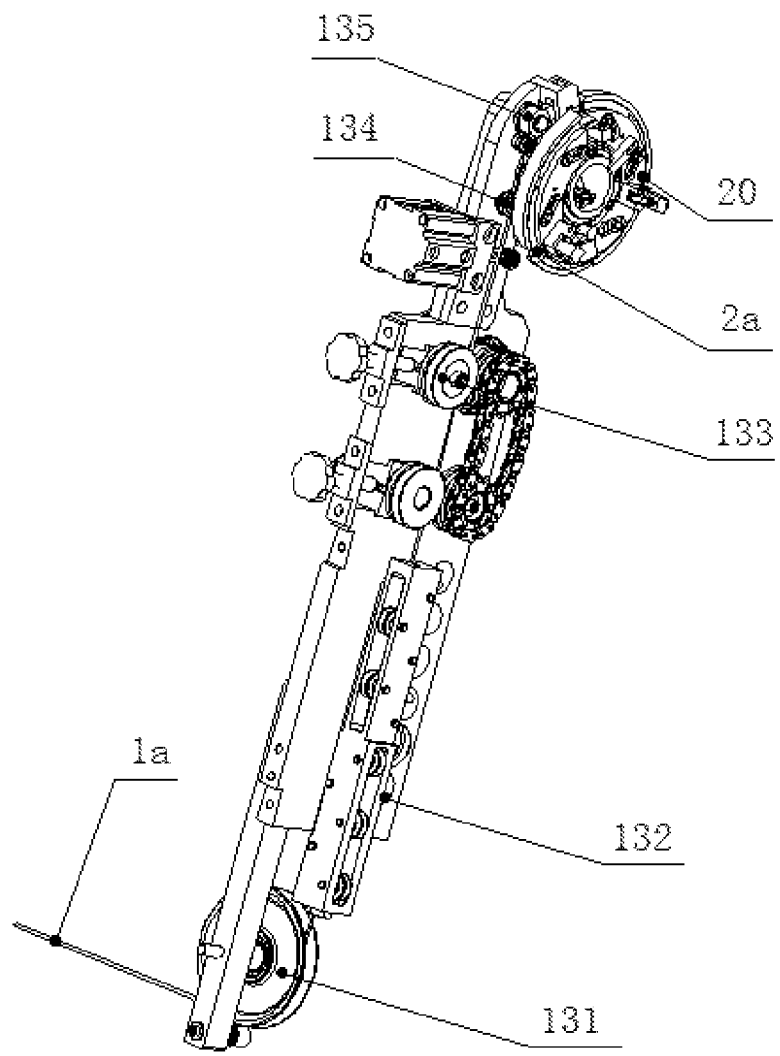
FIG. 10 illustrates a perspective view of a group of a wire rolling unit and a mold unit according to the present disclosure.

Here in after, the work procedure will be described with one group of ring rolling units 13 as an example: a metal wire 1a passes sequentially through the guide wheel means 131, the straightening apparatus 132, the traction and length measuring apparatus 133, and the three-roller ring rolling apparatus 134, and is rolled into a spiral ring 2a that is restricted within the mold system 20 (as shown in FIG. 10); after it is rolled into the spiral ring shown in FIG. 3, the traction and length measuring apparatus 133 stops running, and the cutoff apparatus 135 works.

Because welding would be better to be performed at the same work position of the respective ring rolling units 13, the geometric dimension and the forming position of the rolled ring are required to be accurate and highly repetitive. In the circular path for rolling out rings according to the present disclosure, the mold system 20 is provided so that the metal wire passes through an annular groove of the mold system 20; therefore, when the geometric dimension and forming position of the metal wire changes, the ring can be limited to being still formed on its theoretical path. Moreover, the mold apparatus 20 can also maintains the two free ends of each ring 2a overlapped by holding the free ends of the ring 2a, thus the present disclosure, compared with the prior art, can effectively reduce manual participation during the forming procedure of the plant growth support, which saves time and labor cost and enhances the productivity.

Figure 7:
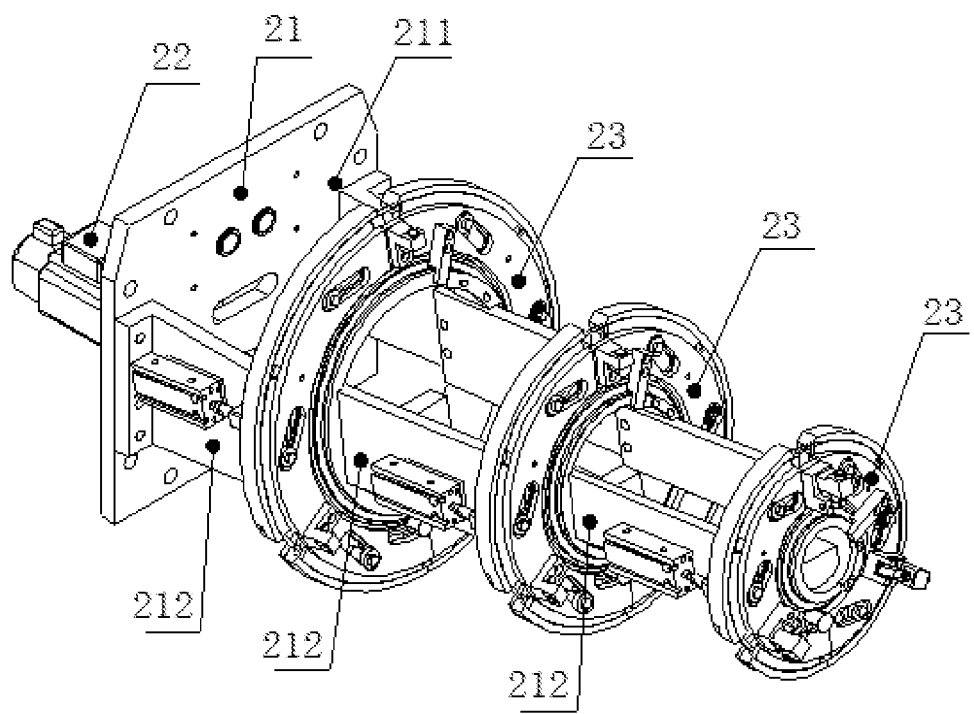
FIG. 7 illustrates a perspective view of a mold system according to the present disclosure.
Figure 8:
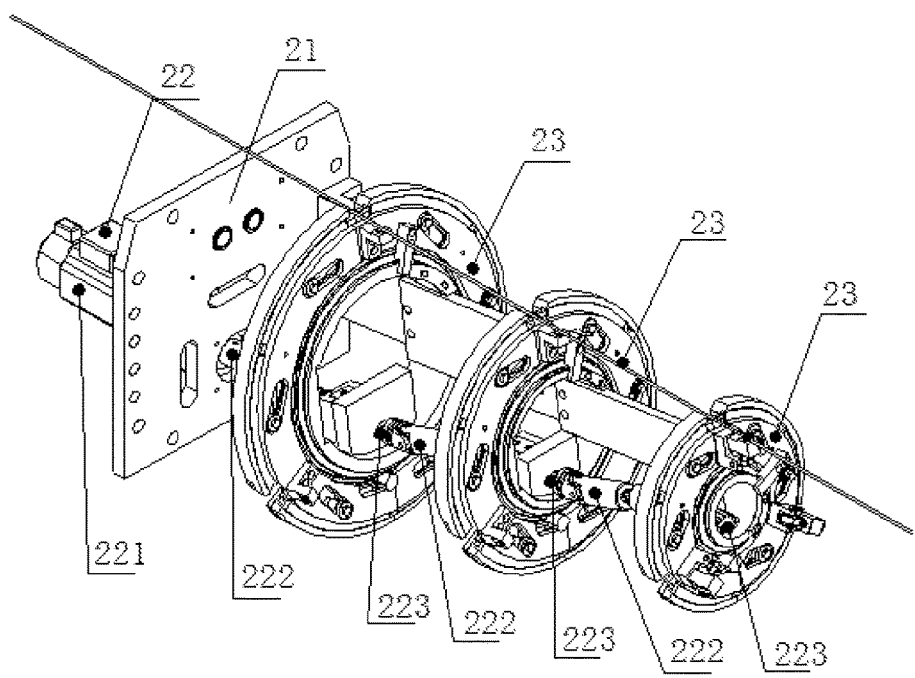
FIG. 8 illustrates a perspective view of a mold system without some of connecting plates according to the present disclosure.

As shown in FIG. 7 and FIG. 8, the mold system 20 comprises a mold support frame 21. A mold power apparatus 22 and a plurality of mold units 23 with the same structure are provided on the mold support frame 21. Each mold unit 23 corresponds to a ring rolling unit 13. The mold unit 23 is disposed on the annular path of the ring rolled out by the ring rolling unit 13, so as to make the metal wire formed in the annular groove of the mold unit 23. As a result, when the geometrical dimension and forming position of the metal wire change, the ring is limited to being still formed on its theoretical path. The mold power apparatus 22 is drivingly connected to all the mold units 23 to drive the mold units 23 to rotate. The mold support frame 21 comprises a mount board 211 for disposing the mold power apparatus 22, and a plurality of connecting plates 212 for integrating the respective mold units 23.

In the embodiment as shown in FIG. 7, there is comprised of three mold units 23. The connecting plates 212 of the mold support frame 21 may comprise a rear connecting plate, a middle connecting plate, and a front connecting plate; and the respective mold units 23 are connected together through a fixed barrel 236 and the connecting plates 212, respectively, thereby forming an integral mold system 20.

Figure 9:
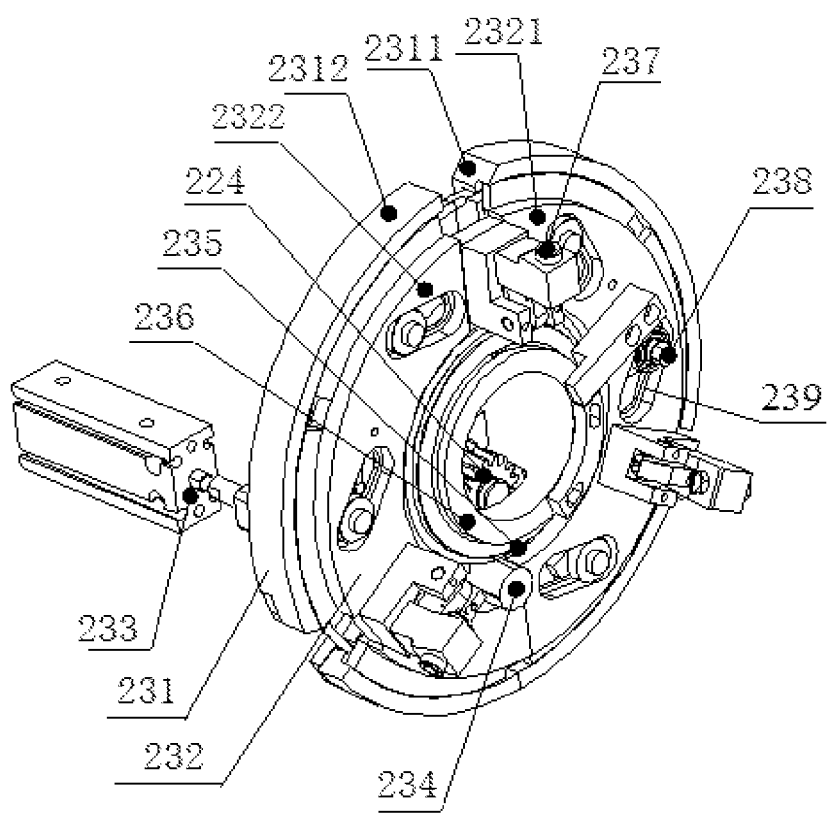
FIG. 9 illustrates a perspective view of a closed mold unit in a mold system according to the present disclosure.

As illustrated in FIG. 9, each mold unit 23 mainly comprises a baseplate 231, a turntable 232, a pushout assembly 233, a return assembly 234, a gear ring 235, and a fixed barrel 236.

Wherein, the turntable 232 is provided on the baseplate 231; a lap of first groove for holding a ring is provided at the circumference of the baseplate 231; a plurality of second grooves for holding straight wires are provided with spacing at the circumference of the baseplate 231; grooves are also provided at the positions of the circumference of the turntable 232 corresponding to the second grooves; magnetic assemblies 237 for absorbing straight wires are provided at the positions on the turntable 232 corresponding to the respective grooves. The mold power apparatus 22 is drivingly connected to the baseplate 231 so as to drive the baseplate 231 to synchronously rotate with the turntable 232.

Specifically, the baseplate 231 is equally divided into two portions from a facade, i.e., a first baseplate element 2321 and a second baseplate element 2312, respectively; the turntable 232 is also equally divided into two portions from the facade, i.e., a first turntable element 2321 and a second turntable element 2322, respectively. The first baseplate element 2311 and the first turntable 2321 are connected together through tablet assemblies 238, and the second baseplate element 2312 and the second turntable element 2322 are connected together through tablet assemblies 238.

A first engaging part and a second engaging part are provided between the first baseplate element 2311 and the second baseplate element 2312, and the first baseplate element 2311 and the second baseplate element 2312 is a slidably connected through the first engaging part, thus the second engaging part between the first baseplate 2311 and the second baseplate 2312 is openable, which can form a rolling position for the ring rolling system 10 to perform ring rolling. The rolling position formed by the opened second engaging part can receive the ring rolling apparatus 134 of the ring rolling system 10, thereby the ring rolling unit 13 able to deliver the mental wire subjected to the rolling action into the first groove; also the second engaging part between the first baseplate element 2311 and the second baseplate element 2312 can be closed by the mold unit 23 to overlap the two free ends of the ring 2a.

The pushout assembly 233 is drivingly connected to the second baseplate element 2312, so as to drive the first baseplate element 2311 and the second baseplate element 2312 to slide relative to each other at the first engaging part, further causing the second engaging part between the first baseplate element 2311 and the second baseplate element 2312 to be opened. Specifically, the pushout assembly 233 is drivingly connected to the second baseplate 2312, based on which, the pushout assembly 233 can provide power to cause the second baseplate element 2312, via the tablet assembly 238, to drive the second turntable 2322 to rotate, via a pin, by a certain angle relative to the first baseplate element 2311, thereby facilitating the ring rolling system 10 to locate itself and roll wires. The power source of the pushout assembly 233 may be an air cylinder.

After the wire is rolled, the return assembly 234 can drive the second engagement part between the first baseplate element 2311 and the second baseplate element 2312 to return. The return assembly 234 may be implemented by a reset spring.

In the embodiment above, the first baseplate element 2311 and the second baseplate element 2312 may be connected by a pin disposed at the first engagement part, wherein the first baseplate element 2311 may be fixedly connected to the pin, and the second baseplate element 2312 may be slidably connected to the pin. When the second baseplate element 2312 slides outward relative to the pin, the second engagement part between the first baseplate element 2311 and the second baseplate element 2312 are opened; and when the second baseplate element 2312 slides inward relative to the pin, the second engagement part of the first baseplate 2311 and the second baseplate 2312 are closed.

In the embodiment above, the first turntable element 2321 and the second turntable element 2322 are configured to be capable of closing and opening the axial end face of the first groove. In this way, the first turntable element 2321 and the second turntable element 2322 may limit the axial displacement of the ring 2a along the first groove by closing the axial end face of the first groove, so as to prevent the ring 2a from disengaging from the first groove, thereby avoiding the disengagement of the ring 2a from the first groove when the ring 2a is not needed to be taken out; moreover, the first turntable element 2321 and the second turntable element 2322 can also release the limit of the axial displacement of the ring 2a along the first groove by opening the axial end face of the first groove, so that the ring 2a can disengage from the first groove under the action of the external force, thus the ring 2a can be taken away from the mold unit 23.

To enable the axial end face of the first groove to be closed and opened by the first turntable element 2321 and the second turntable element 2322 to, the first turntable element 2321 and the second turntable element 2322 in this embodiment are rotatably provided on the baseplate 231, and when rotating relative to the baseplate 231, the first turntable element 2321 and the second turntable element 2322 can generate a radial displacement along the first groove relative to the baseplate 231. So the first turntable element 2321 and the second turntable element 2322 close and open the axial end face of the first groove by moving relative to the baseplate 231 along the radial direction of the first groove.

Further, to enable the first turntable element 2321 and the second turntable element 2322 to generate a radial displacement along the first groove relative to the baseplate 231, as illustrated in FIG. 9, in the embodiment, the first turntable element 2321 and the second turntable element 2322 are respectively provided with an installation slot 239, and the mold unit 23 further comprises a tablet assembly 238, wherein the tablet assembly 238 connects the baseplate 231 with the first turntable element 2321 and the second turntable element 2322 by inserting into the installation slots 239, moreover, when the first turntable element 2321 and the second turntable element 2322 rotate relative to the baseplate 231, the tablet assembly 238 is able to slide in the installation slots 239 which are at an angle to the axial direction of the first groove.

The installation slots 239 are angled with the axial direction of the first groove, therefore, when the first turntable plate 2321 and the second turntable element 2322 rotate relative to the baseplate 231, the first turntable element 2321 and the second turntable element 2322 can generate a radial displacement along the first groove relative to the baseplate 231, thereby closing and opening the axial end face of the first groove.

In the embodiment above, the tablet assembly 238 may comprise a tablet, a fixed slider, a fixed shaft, and a bearing, etc.; the baseplate 231 and the turntable 232 are connected together through a plurality of tablet assemblies 238.

As illustrated in FIG. 8, fixed barrels 236 in respective mold units 23 are connected together through the connecting plates 212, thereby forming an entire mold system 20. The baseplate 231 and the turntable 232 are both fixedly connected to the gear ring 235; the baseplate 231 and the turntable 232 are fitted with the fixed barrels 236 with a clearance; the baseplate 231 and the turntable 232 can rotate relative to the fixed barrel 236.

The mold power apparatus 22 may comprise an electric motor 221, a plurality of couplings 222, a plurality of third transmission shafts 223, and a plurality of gears 224, wherein the respective gears 224, which are connected together by the respective couplings 222 and the third transmission shaft 223, are driven to rotate by the electronic motor 221 and each gear 224 is engaged with the gear ring 235 of the corresponding mold unit 23, so as to drive the mold unit 23 to rotate. Because the dimensions of the respective mold units 23 are inconsistent, synchronous movement of respective groups of mold units 23 can be realized by setting different transmission ratios of each pair of gear and gear ring.

Central parts of the baseplate 231 and the turntable 232 are hollow; the baseplate 231 and the turntable 232 may be partially fixedly connected with the gear ring 235 and partially fitted with the fixed barrel 236 with clearance. The gear 224 rotates to engage with the gear ring 235 so as to drive the baseplate 231 to rotate, thereby driving the turntable 232 to rotate about the fixed barrel 236, resulting in various straight wires being dropped to and welded on the rings from different angles.

The baseplate 231 and the turntable 232 may be implemented as a round structure. A plurality of second grooves for holding straight wires may be provided at intervals, evenly distributed preferred, on the mold unit 23 along the circumference of the mold unit 23. Each of these second grooves is for holding one of those straight wires 3a. The second grooves may be of a U-shape. In this embodiment, one of these second grooves is located at the opening of the ring 2a, i.e., located at a position where two free ends of the ring 2a are overlapped. In this way, the welding for the opening of respective rings 2a can be performed during the procedure of welding the straight wire onto the respective rings 2a, without a need of the welding for the openings of the respective rings 2a being carried out first before the straight wire being welded to the ring 2a, just as the prior art, namely the single opening welding procedure in the prior art can be omitted, therefore the forming procedure of the plant growth support 70 can be further simplified, thereby the efficiency being further enhanced.

As illustrated in FIG. 10, after the wire is rolled and cut off, the ring rolling system 10 moves away from the rolling position; the return assembly 234 returns the second baseplate element 2312 and the second turntable element 2322, causing the second engagement part between the first baseplate element 2311 and the second baseplate element 2312 being closed, so as to wait for the fall of another straight wire. During the rolling procedure, after the metal wire is rolled out into a little more than one lap of spiral wire, i.e., the beginning part of the first lap of the ring overlaps with part of the second lap, the traction and length measuring apparatus 133 stops running. And then the cutoff apparatus 135 starts to work and cut off the metal wire ring. In this case, the whole ring rolling system 10 moves away from the rolling position, and the second baseplate element 2312 and the second turntable 2322 of the mold system 20 return to the initial position, thus the end of the metal ring overlaps with the beginning of its first lap, forming a planar open ring (with a segment of overlapping at the cutoff portion), so as to prepare for the welding procedure after the blanking of straight wires.

The straight wire supplying system 30 is for straightening the metal wire, cutting it off according to a desired length, and feeding the straight wire through its hopper to the external side of the metal rings for welding.

Figure 11:
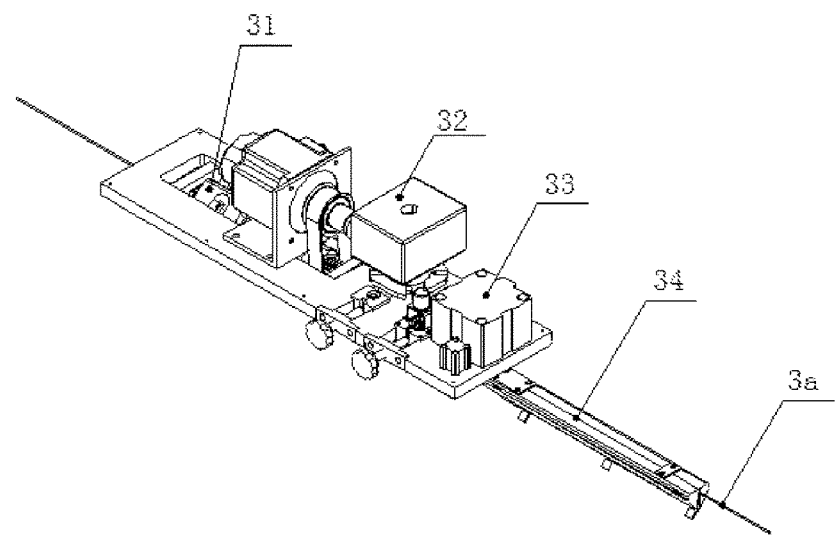
FIG. 11 illustrates a perspective view of a straight wire supplying system according to the present disclosure.

As illustrated in FIG. 11, the straight wire supplying system 30 comprises a straightening apparatus 31, a traction and length measuring apparatus 32, a cutoff apparatus 33, and a blanking structure 34, which are sequentially disposed on the support frame of the straight wire supplying system 30. The metal wire, after being straightened by the straightening apparatus 31, enters into the traction and length measuring apparatus 32, and moves towards the cutoff apparatus 33 under the traction action of the traction and length measuring apparatus 32; when the length of the straight wire reaches the set number preseted by the traction and length measuring apparatus 32, the cutoff apparatus 33 cuts off the straight wire, and then the straight wire falls into the mold system 20 through the blanking structure 34.

Wherein, the straightening apparatus 31 may be implemented as the prior art, the traction and length measuring apparatus 32 may be implemented by a structure similar to the traction and length measuring apparatus 133 of the ring rolling system 10, and the cutoff apparatus 33 may be implemented as the cutoff structure in the prior art, etc., which will not be detailed here.

The blanking structure 34 can bear the metal wire before the metal wire is cut off and can make the straight wire 3a automatically fall onto the plurality of mold units 23 after the metal wire is cut off to form the straight wire 3a. In this embodiment as illustrated in FIG. 11, the blanking structure 34 comprises two layers of hoppers. An inner-layer hopper can be closed to support the straight wire, and also can be open when the straight wire is cuts off by the cutoff apparatus 33, so that the cutoff straight wire falls into an outer-layer hopper and then slides into the second groove of the mold system 20 through the outer-layer hopper. For the reason that the straight wire supplying systems 30 can make each straight wire 3a automatically blank to the mold units 23, it is not needed to manually place the straight wires and the welded ring onto the weld machine, therefore, the continuity and automatic degree of the automatic forming process for the plant growth support may be further enhanced, which will further save time and labor costs and enhance the productivity.

The work procedure of the straight wire supplying system 30 is described here: the metal wire, after being straightened by the straightening apparatus 31, is fed into the blanking structure 34 by the traction and length measuring apparatus 32, so as to be restricted by the inner layer hopper of the blanking structure 34; after the straight wire reaches the preset length, the cutoff apparatus 33 cuts off the straight wire; when the cutoff apparatus 33 cuts off the straight wire, the inner-layer hopper of the blanking structure 34 is opened at the same time, thus the straight wire falls into the outer-layer hopper of the blanking structure 34, and slides into the groove of the n mold system 20 through the outer-layer hopper, thereby being positioned at the upper part of the ring for being welded.

Figure 12:
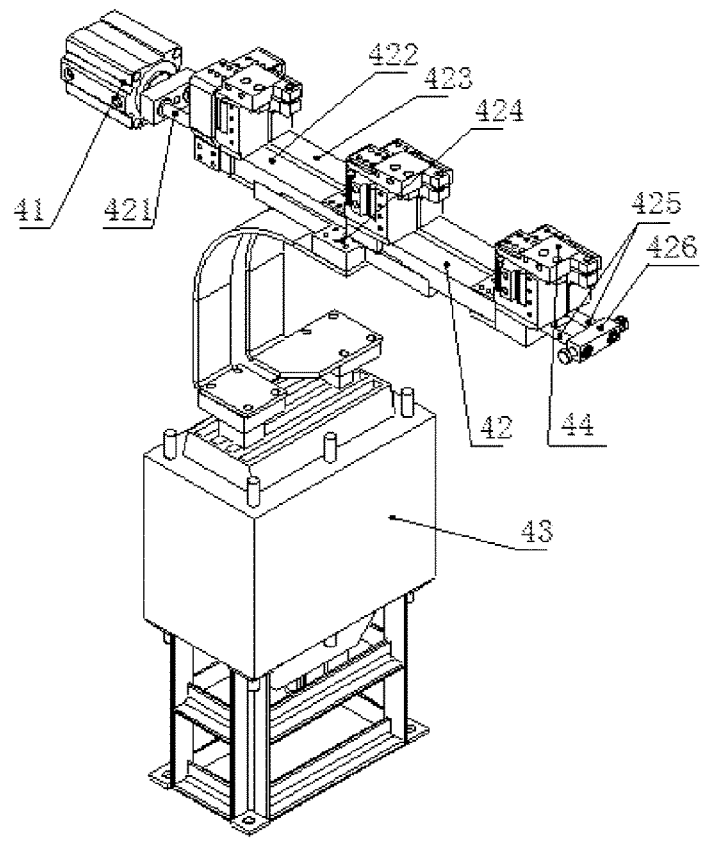
FIG. 12 illustrates a perspective view of a welding system according to the present disclosure.

As illustrated in FIG. 12, the welding system 40 comprises a welding power apparatus 41, a welding connection apparatus 42, a transformation apparatus 43, and a plurality of welding units 44. The respective welding units 44 are disposed on the welding connection apparatus 42; the welding power apparatus 41 is drivingly connected to the welding connection apparatus 42, so the welding connection apparatus 42 can drive the respective welding units 44 to reach or exit the welding work position.

The welding power apparatus 41 is drivingly connected to the welding connection apparatus 42, and the respective welding units 44 are all disposed on the welding connection apparatus 42, so the welding power apparatus 41 can drive all the welding units 44 to simultaneously arrive at or simultaneously exit from the welding work position, which enable the welding system 40 to welding each straight wire 3a with the respective rings 2a at the same time, with a high efficiency. Furthermore, the respective welding units 44 which can exit from the welding work position facilitates another straight wire 3a to blank into another second groove of the mold apparatus 20 for a next welding.

The preferred embodiment in FIG. 12 comprises three groups of welding units 44 with the same structure. The three welding units 44 are disposed on the welding connection apparatus 42 and equidistantly provided between the three mold units 23 according to the spacing between the rings of the plant growth support. The three welding units 44 are for tightly clamping the straight wire with the three metal rings, and welding the rings and the straight wire together.

As illustrated in FIG. 12, the welding connection apparatus 42 may comprise a rear slider 421, a left welding electrode 422, a right welding electrode 423, a welding electrode connecting plate 424, a front slider 425, and a supporting base 426. The left welding electrode 422 and the right welding electrode 423, which are connected together by the welding electrode connecting plate 424, are for transmitting electric power for the welding units 44; the welding units 44 are fixed on the left welding electrode 422 and the right welding electrode 423 with a certain spacing. The rear slider 421 is provided at one end of the left welding electrode 422 and the right welding electrode 423, while the front slider 425 is provided at their other end. The rear slider 421 is fixedly connected to the welding power apparatus 41. The welding power apparatus 41 is fixedly provided on the mold support frame 21 of the mold system 20; the rear slider 421 is slidably provided through the mold support frame 21; the front slider 425 is slidably provided on the support base 426; besides, the support base 426 is fixed on the mold support frame 21 of the mold system 20. The welding power apparatus 41 drives the welding connection apparatus 42 to move back and forth relative to the mold system 20 to reach or exit from the welding work position. The welding connection apparatus 42 may be provided through a middle hollow position of the baseplate 231 and the turntable 232.

The welding power apparatus 41 in the above embodiment may be implemented as an air cylinder.

Figure 13:
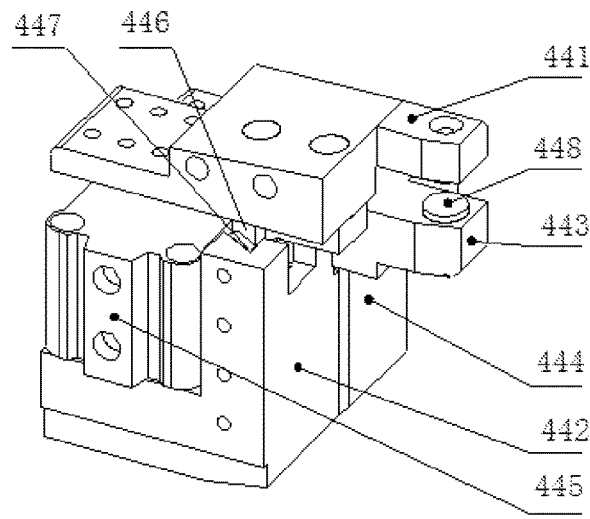
FIG. 13 illustrates a perspective view of a welding unit in a welding system according to the present disclosure.

As illustrated in FIG. 13, the welding unit 44 comprises an upper welding electrode 441, an upper welding electrode base 442, a lower welding electrode 443, a lower welding electrode base 444, and a third air cylinder 445. The upper welding electrode base 442 is threaded with the lower welding electrode base 444. The lower welding electrode 443 is fixed on the lower welding electrode base 444, and the upper welding electrode 441 is slidably provided on a guide rail 446 that is disposed in a guide rail groove 447 provided on the upper welding electrode base 442; the third air cylinder 445 is drivingly connected to the upper welding electrode 441 to drive the upper welding electrode 441 move up and down along the guide rail 446. The lower welding electrode 443 is disposed below the rolled ring and the straight wire; the upper welding electrode 441 is disposed above the rolled ring and the straight wire; and the position for clamping wire between the upper welding electrode 441 and the lower welding electrode 443 is the position where the rolled ring and the straight wire overlaps. Thus when approaching the lower welding electrode 443, the upper welding electrode 441 cooperates with the lower welding electrode 443 to perform the welding.

Further, the guide rail 446 may be a dovetail guide rail (or a sliding bar).

At the initial position, the welding unit 44 is disposed between two adjacent mold units 23; the upper welding electrode 441 is disposed at an upper side of the straight wire, and the lower electrode 443 is disposed at a lower side of the ring, thus there is a larger spacing between the upper welding electrode 441 and the lower welding electrode 443. While during work, the welding unit 44 is driven by the welding connection apparatus 42 to move to the second groove for holding the straight wire on the mold unit 23; the upper welding electrode 441 which is initially disposed at the upper side of the straight wire moves downward to the lower welding electrode 443 which is initially disposed at the lower side of the ring, and finally the upper welding electrode 441 and the lower welding electrode 443 can cooperate with each other to clamp the rolled ring and the straight wire tightly and weld them together.

It should be noted that in order to increase the electricity conductivity and the maintenance convenience of the welding electrodes (i.e., electrodes), as illustrated in FIG. 13, the wire clamping faces of the upper welding electrode 441 and the lower welding electrode 443 are respectively attached with round welding electrodes 448, and the round welding electrodes 448 are mounted on the upper welding electrode 441 and the lower welding electrode 443 through bolts. The materials of the welding electrodes are well-known electrode materials in the industry, which can enhance the welding efficiency, moreover, in the case of being worn, only the round welding electrode 448, rather than the entire upper welding electrode 441 and the lower welding electrode 443, is replaced. Of course, in order to enhance the electricity conductivity, the upper welding electrode 441 and the lower welding electrode 443 may be entirely made of electrode materials, which will result in higher cost.

The work flow of the welding system 40 is described as below: After the metal wire is rolled into a ring and is cut off, and the mold unit 23 returns and rotates by 240° anticlockwise, then the first straight wire falls into the appropriate position and is accurately clamped, and welding can be performed by the transformer apparatus 43 in the next step. The transformer apparatus 43 comprises a transformer and a connection electrode. In the present embodiment, the upper welding electrode 441 and the lower welding electrode 443 are used as two electrodes of a butt welding machine; the connection electrodes (copper strip) of the transformer are connected to the left welding electrode 422 and the right welding electrode 423 respectively, and then the left welding electrode 422 and the right welding electrode 423 are respectively connected to the upper welding electrode 441 and the lower welding electrode 443 via the connection electrode (copper strip). Because two electrodes must move in opposite directions during welding, a driving means has to be provided at the upper welding electrode base 442 connected with the upper welding electrode 441 or the lower welding electrode base 444 connected with the lower welding electrode 443 to make sure the welding can be performed normally. The driving means in the present implementation is implemented as a third air cylinder 445. During welding, the upper welding electrode 441 and the lower welding electrode 443 move close to each other, causing the straight wire and two cross sections of the overlapping part of the open ring also move close to each other and finally contact with each other; afterwards, the transformer is powered on to provide a large current to melt the pressure fitting face, thereby the two cross sections being directly welded with the straight wire.

After a group of welding is completed, the upper welding electrode 441 and the lower welding electrode 443 move far away from each other, and the welding unit 44 returns. Then, after the mold system 20 rotates by 120° clockwise, the second straight wire falls, the welding unit 44 moves into position, and the welding action above is repeated. After the welding is done, the welding unit 44 returns again.

Then, the actions above are repeated till the plant growth support 70 is formed.

It can be seen that, in this embodiment, the respective mold units 23 can simultaneously rotate, and during the procedure where the plurality of mold units 23 rotate simultaneously, the welding system 40 can weld the plurality of straight wires 3a onto rings 2a carried by the respective mold units 23, thereby forming a plant growth support 70. Because the plant growth support 70 can be formed using the same welding system 40, relative to the prior art in which two separate welding machines need to be provided to separately weld the closed rings 2a and assembly weld the straight wires onto the rings 2a, the automatic forming machine for plant growth supports according to the present embodiment also has features of simple and compact structure with a highly integrated degree.

Moreover, each time the respective mold units 23 in the present embodiment rotates a set angle along a same direction, the welding system 40 welds one of the straight wires 3a onto rings 2a in the respective mold units 23; in this way, the plurality of straight wires 3a needed by the plant support can be evenly distributed along the circumference of the respective rings 2a, which will increase the stability of the structure of the plant growth supports 70.

After the welding unit 44 returns, the mold unit 23 rotates by a certain angle again clockwise, then the mold unit 23 is opened, and the wire grabbing apparatus in the mechanic arm system 50 grabs the formed plant growth support and moves out of the mold system 20.

It should be noted that as required by welding, insulation is compulsory between two electrodes of the welding machine. Therefore, on a certain connection surface of the longitudinal welding unit 44, insulation means needed to be set to satisfy the above requirement.

As illustrated in FIG. 1, the removing system 50 is mounted at one side of the machine frame 60, for grabbing the formed plant growth support away and stacking formed plant growth supports together.

Figure 14:
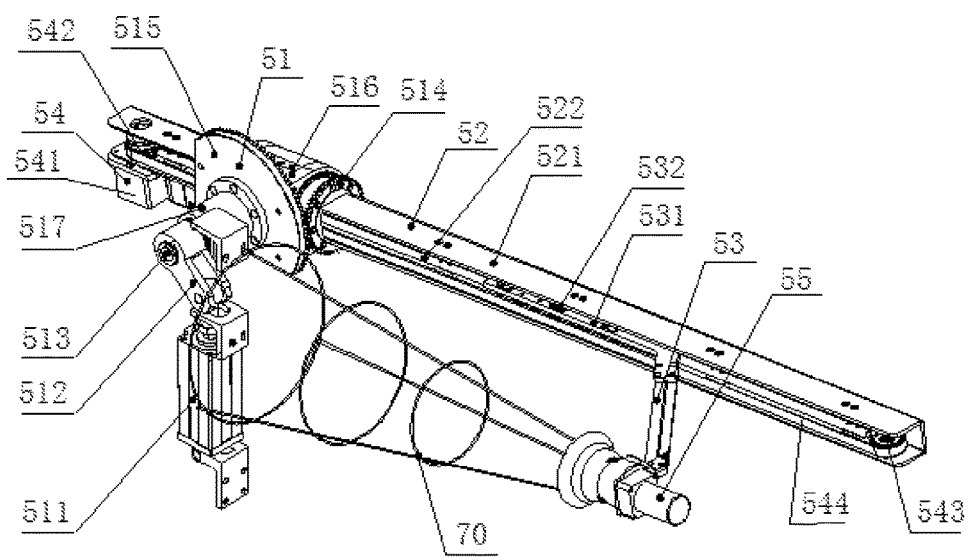
FIG. 14 illustrates a perspective view of a removing system (in wire grabbing state) according to the present disclosure.

As illustrated in FIG. 14, the removing system 50 comprises a first power apparatus 51, a fixed arm assembly 52, a movable arm assembly 53, and a second power apparatus 54. The first power apparatus 51 is drivingly connected to the fixed arm assembly 52 so as to drive the fixed arm assembly 52 to self-rotate and rotate relative to the machine frame 60; the movable arm assembly 53 is provided within the fixed arm assembly 52; the second power apparatus 54 is drivingly connected to the movable arm assembly 53 so as to drive the movable arm assembly 53 to move back and forth along the fixed arm assembly 52 (i.e., along the axial direction of the first groove); a wire grabbing apparatus 55 for grabbing the plant growth support is provided on the movable arm assembly 53, and the wire grabbing apparatus 55 can move close to or move away from the mold system 20 under the driving of the movable arm 53.

The first power apparatus 51 comprises a fourth air cylinder 511, a third connecting rod 512, a fourth transmission shaft 513, a movable bevel gear 514, and a fixed bevel gear 515. The piston rod of the fourth air cylinder 511 is hinged with the third connecting rod 512; the fourth transmission shaft 513 is fixedly provided through the third connecting rod 512 and is fixedly connected to the movable bevel gear 514 disposed on the fixed arm assembly fixed arm assembly 52; the movable bevel gear 514 is engaged with the fixed bevel gear 515 on the machine frame 60. Thus the power supplied by the fourth air cylinder 511 can be transmitted to the fourth transmission shaft 513 via the third connecting rod 512 to drive the fourth transmission shaft 513 to rotate, and the fourth transmission shaft 513 then can drive the movable bevel gear 514 to rotate and engage with the fixed bevel gear 515, thereby causing the self-rotation of the fixed arm assembly 52.

Specifically, the third connecting rod 512 is fixedly connected to the fourth transmission shaft 513 via a flat key; the fourth transmission shaft 513 is fixedly connected to the rotary shaft base 516 which is disposed on the fixed arm assembly 52; the rotary shaft base 516 is fixedly connected to the movable bevel gear 514; the fourth transmission shaft 513 is mounted in a stationary sleeve 517 via a bearing; the stationary sleeve 517 and the fixed bevel gear 515 are both fixed on the machine frame 60. The fixed arm assembly 52 and the rotary shaft base 516 are fixed together; the movable bevel gear 514 and the fixed bevel gear 515 to rotate and engage through the third connecting rod 512 and the fourth transmission shaft 513, meanwhile the fixed arm assembly 52 is driven to self-rotate, thereby causing the removing system 50 to self-rotate 180° and rotate 90° relative to the machine frame 60 both in a range of horizontal and vertical 90°.

The second power apparatus 54 comprises a driving motor 541, a driving wheel 542, a driven wheel 543, and a synchronous belt 544; the drive motor 541 is drivingly connected to the driving wheel 542; the driving wheel 542 drives the driven wheel 543 to rotate through the synchronous belt 544; the movable arm assembly 53 is provided on the synchronous belt 544 and driven by the synchronous belt 544 to move back and forth along the fixed arm assembly 52, so as to drive the wire grabbing apparatus 55 to move close to or move away from the mold system 20.

The fixed arm assembly 52 comprises a fixed arm 521 and a guide rod 522; the movable arm assembly 53 comprises a movable arm 531 and a movable roller 532; the movable arm 531 is restricted in the fixed arm 521 through the cooperation between the movable roller 532 and the guide rod 522, and the movable arm 531 drives the wire grabbing apparatus 55 so as to slide along the fixed arm 521 via the second power apparatus 54, thereby moving away and stacking the plant growth support after the plant growth support frame is grabbed.

Figure 16:
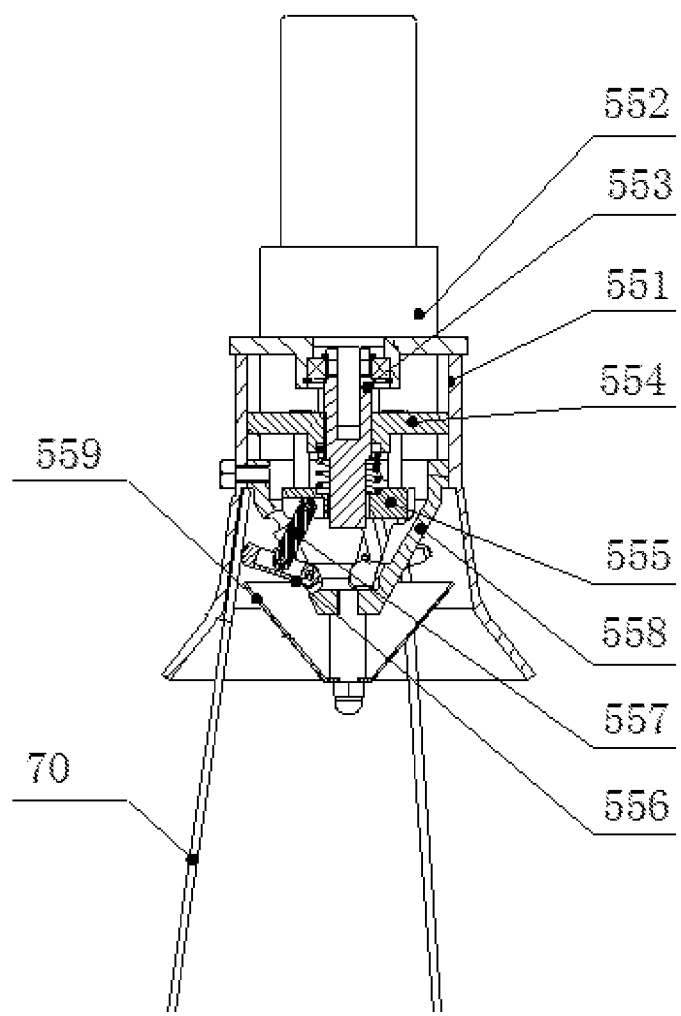
FIG. 16 illustrates a perspective view of a wire grabbing apparatus according to the present disclosure.

As illustrated in FIG. 16, the wire grabbing apparatus 55 comprises a fixed hood 551 on which a wire grabbing drive motor 552 is provided; the wire grabbing drive motor 552 is drivingly connected to a guide shaft 553 in the fixed hood 551; a guide nut 554 is threaded to the guide shaft 553; the guide nut 554 is fixedly connected to a pressure plate 555; the pressure plate 555 is connected to a plurality of pressure blocks 556, and a gap that allows insertion of the straight wire 3a is provided between each pressure block 556 and the fixed hood 551. The wire grabbing drive motor 552 drives the guide shaft 553 to rotate, then the guide nut 554 moves along the guide shaft 553 to drive the pressure plate 555 and the pressure blocks 556 to move, so as to change the gap between the pressure blocks 556 and the fixed hood 551; in a state that the gap between the pressure block 556 and the fixed hood 551 is narrowed, straight wires of the plant growth support 70 is pressed tightly, thereby implementing wire grabbing; in a state that the gap between the pressure block 556 and the fixed hood 551 is broadened, the straight wires of the plant growth support frame 70 is released, thereby implementing wire releasing. It can be seen that the guide shaft 553, guide nut 554, pressure plate 555, and the wire grabbing drive motor 552 in the present embodiment are used as an actuating mechanism, which is able to drive the wire grabbing apparatus 55 to grab and release the plant growth support 70 by changing the gap between the pressure block 556 and the inner wall of the fixed hood 551.

Further, the guide shaft 553 between the guide nut 554 and the pressure plate 555 may be further provided with a spring. The pressure block 556 is connected to the pressure plate 555 through the fourth connecting rod 557. The number of the pressure blocks 556 as provided is identical to the number of the straight wires of the plant growth support 70.

Further, the guide nut 554 is embedded in the groove of the fixed hood 551 through a boss provided on the guide nut 554, so that the guide nut 554 can only move up and down. A fixed barrel 558 which tapers downward (i.e., along the direction away from the guide nut 554) is also fixedly provided in the fixed hood 551. As illustrated by the FIG. 16, in this embodiment, one end of the pressure block 556 is hinged onto the fixed barrel 558, while the other end of the pressure block 556 is free and forms, with the inner wall of the fixed barrel 558, the above gap into which the straight wire 3a can insert; further, one end of the fourth connecting rod 557 is hinged onto the pressure plate 555, and the other end of the fourth connecting rod 557 is hinged in the middle part of the two ends of the pressure block 556. Based on this, when the pressure plate 555 moves relative to the fixed hood 551 under the driving by the guide nut 554, the fourth connecting rod 557 can drive the pressure block 556 to sway relative to the fixed barrel 558, thereby changing the gap between the pressure block 556 and the fixed hood 551.

Further, a protective shield 559 that tapers downward is fixedly provided on the fixed barrel 558. The protective shield 559 plays a role of smoothly guiding the straight wire of the plant growth support 70 into the gap between the pressure block 556 and the fixed hood 551.

The work flow of the wire grabbing apparatus 55 includes:

Wire grabbing: the wire grabbing drive motor 552 drives the guide shaft 553 to rotate, so that the guide nut 554 compresses the spring while moving downward and causes the pressure plate 555 to move downward; the fourth connecting rod 557 drives the pressure block 556 to rotate downward; the gap between the pressure blocks 556 (which maybe 3 pressure blocks 556 being evenly distributed) and the fixed hood 551 is narrowed to press the straight wire of the plant growth support 70 tightly, thereby implementing the function of wire grabbing.

Wire releasing: the wire grabbing drive motor 552 drives the guide shaft 553 to rotate anticlockwise; the guide nut 554 moves upward while driving the pressure plate 555 to move upward; the fourth connecting rod 557 drives the pressure block 556 to rotate upward; the gap between the pressure blocks 556 (evenly distributed by 3) and the fixed hood 551 is enlarged to release the straight wire of the plant growth support 70, thereby implementing the wire releasing function.

The work flow of the removing system 50 includes: the first power apparatus 51 drives to cause the removing system 50 to rotate and self-rotate by 180° within a horizontal and vertical range of 90° via the fixed arm assembly 52. The movable arm assembly 53 driven by the second power apparatus 54 can drive the wire grabbing apparatus 55 to reciprocally move in the fixed arm 521, thereby moving away and stacking the plant growth support after the plant growth support is grabbed.

A control system in the present disclosure provides a manipulation command, monitoring and the like for the normal operation of the entire machine. The auxiliary system comprises power preparation elements (e.g., hydraulic cylinder, distributor, air cylinder, and the like) of the driving apparatus for the respective parts of the machine.

In the embodiment of the automatic forming machine for plant growth supports as illustrated in FIG. 1, there are three groups of ring rolling units 13, mold units 23, and welding units 44, respectively; moreover, grooves for holding straight wires are provided with a circumferential spacing of 120° on the baseplate 231 and the turntable 232 of the mold unit 23. The specific work flow is provided as follows:

Three metal wires 1a, 1b, and 1c with round cross sections enter into the mold system 20 through the guide wheel means 131, the straightening apparatus 132, the traction and length measuring apparatus 133, and the ring rolling apparatus 134 of the ring rolling system 10; in the mold system 20 (in the pushout state), they are rolled into three rings and then cut off by the cutoff apparatus 135; afterwards the ring rolling system 10 moves out of the rolling position, and the mold unit 23 returns and at the same time rotates 240° counterclockwise;

The first straight wire 3a after being straightened and cut off by the straight wire supplying system 30 falls into an appropriate position of the magnetic assembly 237 and is attracted there; the welding system 40 moves from the original position to the second groove of the mold unit 23; the upper welding electrode 441 moves downward to the lower welding electrode 443, making the straight wire 3a and the overlapping cross sections of the open rings of metal wires 1a, 1b, and 1c also approach each other and contact; afterwards, the transformer is powered on to provide a large current to melt the pressure fitting face, so that the rings are directly welded with the straight wire 3a. After a group is completely welded, the upper welding electrode 441 and the lower welding electrode 443 are opened; the welding unit 44 returns.

Then, after the mold system 20 rotates by 120° clockwise, the second straight wire falls and the welding unit 44 moves into position, and the welding action above is repeated. After the welding is done, the welding unit 44 returns.

Then, the above actions are repeated. After the welding unit 44 returns again, the turntable 232 rotate relative to the baseplate 231, and the axial end face of the first groove is opened by the first turntable element 2321 and the second turntable element 2322, which makes the respective mold units 23 open up, and then the removing system 50 moves the formed plant growth support 70 out of the mold system 20 and stack them the formed plant growth supports 70.

Figure 15:
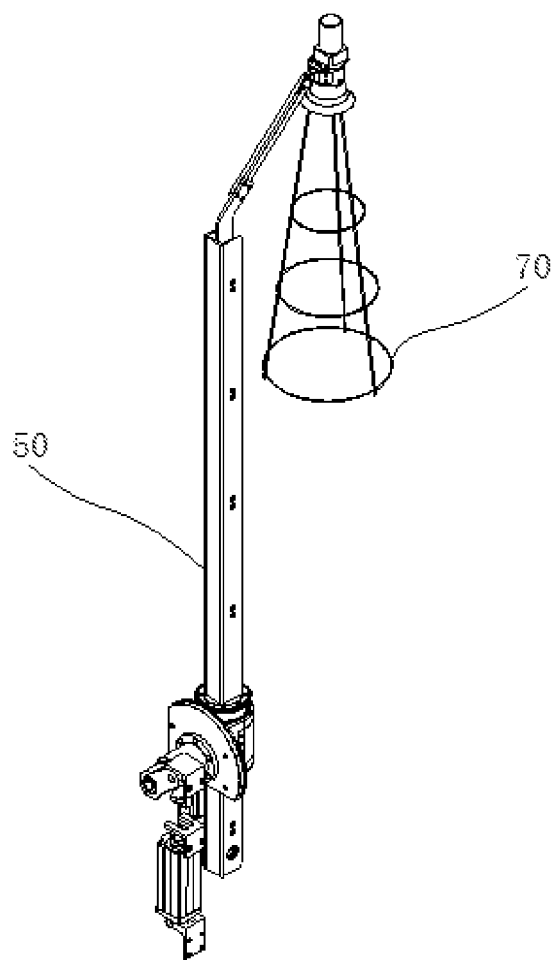
FIG. 15 illustrates another perspective view of a removing system (in moving away and stacking states) according to the present disclosure.

Afterwards, the wire grabbing apparatus 55 of the removing system 50 grabs the formed plant growth support 70 and moves it out of the mold system 20, then while the movable arm assembly 53 moves in the fixed arm 521, the first power apparatus 51 takes action, making the fixed arm assembly 52 drive the movable arm assembly 53 to rotate and self-rotate by 180° (as shown in FIG. 15), and afterwards, the wire grabbing apparatus 55 releases, and the plant growth support 70 drops.

Meanwhile, the movable parts of each system return to their original positions to prepare for repeating a next group of actions. In this way, the automatic forming machine for plant growth supports according to the present disclosure completes ring rolling and automatic welding in a plurality of work positions.

The automatic forming machine for plant growth supports according to the present disclosure automatically performs metal wire straightening, rolling, blanking, welding, grabbing, moving away, and stacking procedures at different work positions of the same machine, which saves time and labor costs, and thus enhances the productivity.

In the depiction of the present disclosure, it should be understood that terms like "first," "second," and "third" are used to limit parts, which are only for easily distinguishing the parts; unless otherwise stated, the terms have no special meaning, and therefore cannot be understood as limitation of the protection scope of the present disclosure.

Finally, it should be stated that the embodiments above are only for illustrating the technical solution of the present disclosure, not for limiting it; although the present disclosure have been described in detail with reference to the preferred embodiments, those skilled in the art should understand that the preferred embodiments of the present disclosure may be modified or part of technical features may be replaced in equivalence; without departing from the spirit of the technical solution of the present disclosure, such modifications and equivalent replacements should be covered in the scope of the technical solution as recited in the present disclosure.

The invention claimed is:

1. An automatic forming machine for plant growth supports, comprising a ring rolling system, a mold system, and a welding system, which are all disposed on a machine frame, the ring rolling system comprises a ring rolling unit, and the mold system comprises a mold unit, wherein the ring rolling unit is adapted to roll a metal wire and make the metal wire be formed into a ring with an opening in the mold unit; the mold unit is for carrying the ring and making two free ends of the ring with an opening aligned or overlap with each other;

wherein the welding system is adapted to weld the opening of the ring carried by the mold unit, causing the ring to become a closed ring;

wherein the ring rolling system comprises a plurality of the ring rolling units, and the mold system comprises a plurality of the mold units, wherein the ring rolling units are provided in one-to-one correspondence with the mold units, and each of the ring rolling units makes a metal wire being formed into one ring with an opening in the corresponding mold unit, and the welding system is capable of welding the openings of the rings carried by the respective mold units; and wherein the plurality of mold units is able to rotate synchronously, and during the simultaneous rotation of the plurality of mold units, the welding system welds a plurality of straight wires onto the rings in the respective mold units to form the plant growth support.

2. The automatic forming machine for plant growth supports according to claim 1, characterized in that the mold unit comprises a baseplate with an annular first groove for holding the ring, and the first groove makes the two free ends of the ring aligned or overlap with each other.

3. An automatic forming machine for plant growth supports, comprising a ring rolling system, a mold system, and a welding system, which are all disposed on a machine frame, the ring rolling system comprises a ring rolling unit, and the mold system comprises a mold unit, wherein the ring rolling unit is adapted to roll a metal wire and make the metal wire be formed into a ring with an opening in the mold unit; the mold unit is for carrying the ring and making two free ends of the ring with an opening aligned or overlap with each other;

wherein the welding system is adapted to weld the opening of the ring carried by the mold unit, causing the ring to become a closed ring, wherein the mold unit comprises a baseplate with an annular first groove for holding the ring, and the first groove makes the two free ends of the ring aligned or overlap with each other, and wherein the baseplate comprises a first baseplate element and a second baseplate element with a first engaging part between their first ends and a second engaging part between their second ends, wherein the first baseplate element and the second baseplate element is slidably connected to each other at the first engaging part, thus the second engaging part is adapted to be opened or closed, and when the second engaging part is opened, the ring rolling unit delivers the metal wire subjected to a rolling action into the first groove; and when the second engaging part is closed, the mold unit makes the two free ends of the ring aligned or overlapped with each other.

4. The automatic forming machine for plant growth supports according to claim 3, characterized in that the mold unit further comprises a first turntable element on the first baseplate element and a second turntable element on the second baseplate element, wherein the first turntable element and the second turntable element are adapted to close and open an axial end face of the first groove.

5. The automatic forming machine for plant growth supports according to claim 4, characterized in that the first turntable element and the second turntable element are rotatably provided on the baseplate, and when rotating relative to the baseplate, the first turntable element and the second turntable element generate a radial displacement along the first groove relative to the baseplate to open or close the axial end face of the first groove.

6. The automatic forming machine for plant growth supports according to claim 5, characterized in that the first turntable element and the second turntable element are both provided with an installation slot, and the mold unit further comprises a tablet assembly, wherein the tablet assembly connects the baseplate with the first turntable element and the second turntable element by inserting into the installation slots; and when the first turntable element and the second turntable element rotate relative to the baseplate, the tablet assembly is able to slide in the installation slots which are at an angle to the axial direction of the first groove, so that the first turntable element and the second turntable element generate the radial displacement along the first groove relative to the baseplate.

7. The automatic forming machine for plant growth supports according to claim 1, characterized in that the ring rolling unit is able to arrive at or exit from a rolling position, where the ring rolling unit starts to roll the metal wire and make, in the mold unit, the metal wire be formed into the ring with an opening.

8. The automatic forming machine for plant growth supports according to claim 7, characterized in that the ring rolling unit arrives at or exit from the rolling position by rotating relative to the machine frame; the ring rolling system further comprises a ring rolling support frame and a rotation power apparatus, wherein the ring rolling support frame, on which the ring rolling unit is disposed, is rotatably connected to the machine frame; and the rotation power apparatus is drivingly connected to the ring roll support frame, so as to drive the ring rolling unit to rotate relative to the machine frame by driving the ring roll support frame relative to the machine frame.

9. The automatic forming machine for plant growth supports according to claim 1, characterized in that the welding system comprises a plurality of welding units which are provided in one-to-one correspondence with the mold units, and each of the welding units is for welding the opening of one ring carried by the corresponding mold unit.

10. An automatic forming machine for plant growth supports, comprising a ring rolling system, a mold system, and a welding system, which are all disposed on a machine frame, the ring rolling system comprises a ring rolling unit, and the mold system comprises a mold unit, wherein the ring rolling unit is adapted to roll a metal wire and make the metal wire be formed into a ring with an opening in the mold unit; the mold unit is for carrying the ring and making two free ends of the ring with an opening aligned or overlap with each other;

wherein the welding system is adapted to weld the opening of the ring carried by the mold unit, causing the ring to become a closed ring, wherein the ring rolling system comprises a plurality of the ring rolling units, and the mold system comprises a plurality of the mold units, wherein the ring rolling units are provided in one-to-one correspondence with the mold units, and each of the ring rolling units makes a metal wire being formed into one ring with an opening in the corresponding mold unit, and the welding system is capable of welding the openings of the rings carried by the respective mold units;

wherein the welding system comprises a plurality of welding units which are provided in one-to-one correspondence with the mold units, and each of the welding units is for welding the opening of one ring carried by the corresponding mold unit; and wherein the welding system further comprises a welding power apparatus for driving the plurality of welding units to synchronously arrive at or synchronously exit from the welding work position at which the welding units perform welding.

11. The automatic forming machine for plant growth supports according to claim 1, characterized in that each time the plurality of mold units rotate by a set angle along a same direction, the welding system welds one of the straight wires onto the rings in the respective mold units, so that the plurality of straight wires are evenly distributed along the circumference of the respective rings.

12. The automatic forming machine for plant growth supports according to claim 11, characterized in that the mold system comprises a mold power apparatus, which comprises an electric motor, a plurality of gears and a plurality of gear rings, wherein the gear rings are provided on the mold units in one-to-one correspondence with the mold units, and each gear is engaged with the corresponding gear ring; the electric motor is drivingly connected to the gears so as to drive the plurality of mold units to rotate synchronously.

13. The automatic forming machine for plant growth supports according to claim 1, characterized in that a plurality of second grooves are provided at intervals on the mold unit along the circumference of the mold unit, each of the second grooves being for holding one of the plurality of straight wires.

14. The automatic forming machine for plant growth supports according to claim 13, characterized in that a the mold unit further comprises a plurality of magnetic assemblies which are provided in one-to-one correspondence with the plurality of second grooves, each of the magnetic assemblies being for absorbing the straight wire in the corresponding second groove.

15. The automatic forming machine for plant growth supports according to claim 13, characterized in that one of the plurality of second grooves is located at a position where two free ends of the ring are aligned or overlapped with each other.

16. The automatic forming machine for plant growth supports according to claim 1, characterized in that the automatic forming machine for plant growth supports further comprises of a straight wire supplying system disposed on the machine frame, and the straight wire supplying system is for providing the plurality of straight wires to be welded onto the rings.

17. The automatic forming machine for plant growth supports according to claim 16, characterized in that the straight wire supplying systems is capable of straightening the metal wire and then cutting off the metal wire at the desired length, thereby forming each straight wire; the straight wire supplying systems is adapted to make each straight wire automatically fall onto the plurality of mold units.

18. The automatic forming machine for plant growth supports according to claim 16, characterized in that the straight wire supplying system comprises a blanking structure for carrying the metal wire before the metal wire is cut off and making the straight wire automatically fall onto the plurality of mold units after the metal wire is cut off to form the straight wire.

19. The automatic forming machine for plant growth supports according to claim 18, characterized in that the blanking structure comprises an inner-layer hopper and an outer-layer hopper, and the inner-layer hopper is able to be opened and closed, wherein before the metal wire is cut off, the inner-layer hopper is in a closed state so as to carry the metal wire; and when the metal wire is cut off to form the straight wire, the inner-layer hopper is automatically opened, so that the straight wire automatically falls into the outer-layer hopper and onto the plurality of mold units via the outer-layer hopper.

20. The automatic forming machine for plant growth supports according to claim 1, characterized in that the diameter of the first groove on a mold unit is different from the diameter of the first groove on another mold unit, and the respective ring rolling units makes, in the corresponding mold units, the metal wire to form rings of different diameters.

21. The automatic forming machine for plant growth supports according to claim 1, characterized in that the automatic forming machine for plant growth supports further comprises a removing system disposed on the machine frame, and the removing system is for taking down the plant growth support from the mold system after it is formed.

22. The automatic forming machine for plant growth supports according to claim 21, characterized in that the removing system comprises a fixed arm assembly, a movable arm assembly, a second power apparatus, and a wire grabbing apparatus, wherein the fixed arm assembly is connected onto the machine frame; the movable arm assembly is movably provided on the fixed arm assembly; the wire grabbing apparatus is provided on the movable arm assembly, the second power apparatus is drivingly connected to the movable arm assembly, and under a driving action of the second power means, the movable arm assembly drives the wire grabbing apparatus to move relative to the fixed arm assembly to make the wire grabbing apparatus move close to or move away from the mold system, and the wire grabbing apparatus is capable of grabbing the formed plant growth support when it approaches the mold system, and the wire grabbing apparatus is capable of taking down the formed plant growth support from the mold system when the wire grabbing apparatus moves away from the mold system.

23. The automatic forming machine for plant growth supports according to claim 22, characterized in that the wire grabbing apparatus comprises a fixed hood, an actuating mechanism, and a pressure block, wherein the pressure block is disposed in the fixed hood, and a gap into which the straight wire can insert is provided between the pressure block and the inner wall of the fixed hood; the actuating mechanism is drivingly connected to the pressure block, and the actuating mechanism is capable of changing the gap between the pressure block and the inner wall of the fixed hood by driving the pressure block to move relative to the fixed hood, so as to enable the wire grabbing apparatus to grab and release the plant growth support.

24. The automatic forming machine for plant growth supports according to claim 23, characterized in that the actuating mechanism comprises a guide shaft, a guide nut, a pressure plate, and a wire grabbing drive motor, wherein the guide shaft is rotatably provided in the fixed hood, and the axis of the guide shaft is parallel to the axis of the fixed hood; the guide nut is threadedly connected to the guide shaft; the wire grabbing drive motor is for driving the guide shaft to rotate so as to drive the guide nut to move axially along the guide shaft; the pressure plate is connected between the guide nut and the pressure block, and the pressure plate is adapted to convert the axial movement of the guide nut along the guide shaft into the movement of the pressure block towards or away from the inner wall of the fixed hood, thereby changing the gap between the pressure block and the inner wall of the fixed hood.

25. The automatic forming machine for plant growth supports according to claim 24, characterized in that the wire grabbing apparatus further comprises a fixed barrel which is fixedly provided in the fixed hood and tapers towards the direction away from the guide nut; one end of the pressure block is hinged onto the fixed barrel, while the other end of the pressure block is free, the gap into which the straight wire can insert is formed between the other end and the inner wall of the fixed barrel; the actuating mechanism further comprises a fourth connecting rod, whose one end is hinged onto the pressure plate and the other end is hinged in the middle part between the two ends of the pressure block.

26. The automatic forming machine for plant growth supports according to claim 25, characterized in that the wire grabbing apparatus further comprises a protective shield fixedly provided on the fixed barrel, and the protective shield tapers towards the direction away from the guide nut, so as to guide the straight wire into the gap between the pressure block and the inner wall of the fixed hood.

27. The automatic forming machine for plant growth supports according to claim 21, characterized in that the removing system is also capable of stacking the plant growth support which is removed from the mold apparatus.

28. The automatic forming machine for plant growth supports according to claim 27 characterized in that the removing system further comprises a first power apparatus which is drivingly connected to the fixed arm assembly, and the first power plant is capable of driving the fixed arm assembly to self-rotate and rotate relative to the machine frame, so that the removing system stacks the plant growth support.

29. The automatic forming machine for plant growth supports according to claim 28, characterized in that the first power apparatus comprises a fourth air cylinder, a third connecting rod, a fourth transmission shaft, a fixed bevel gear fixedly provided on the machine frame, and a movable bevel gear fixedly connected to the fixed arm assembly, wherein the fixed bevel gear and the movable bevel gear are engaged with each other; the fourth cylinder is connected to the fourth transmission shaft via the third connecting rod whose two ends are respectively hinged to the fourth cylinder and the fourth transmission shaft; the fourth transmission shaft is rotatably provided in the central hole of the fixed bevel gear; and the fixed arm assembly is fixedly connected to the fourth transmission shaft, so that the fourth cylinder is capable of driving, via the third connecting rod and the fourth transmission shaft, the movable bevel gear to engage with the fixed bevel gear, thereby causing the rotation and the self-rotation of the fixed arm assembly.

\* \* \* \* \*